(12) United States Patent
Hu et al.

(10) Patent No.: US 12,292,241 B2
(45) Date of Patent: May 6, 2025

(54) THROTTLING HEAT EXCHANGE ASSEMBLY

(71) Applicant: ZHEJIANG SANHUA AUTOMOTIVE COMPONENTS CO., LTD., Zhejiang (CN)

(72) Inventors: Meiyan Hu, Zhejiang (CN); Bin Song, Zhejiang (CN); Linzhong Wu, Zhejiang (CN); Yunpeng Wang, Zhejiang (CN); Zhengyi Yin, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 310 days.

(21) Appl. No.: 18/005,653

(22) PCT Filed: Jul. 22, 2021

(86) PCT No.: PCT/CN2021/107801
§ 371 (c)(1),
(2) Date: Jan. 16, 2023

(87) PCT Pub. No.: WO2022/022371
PCT Pub. Date: Feb. 3, 2022

(65) Prior Publication Data
US 2023/0272986 A1     Aug. 31, 2023

(30) Foreign Application Priority Data
Jul. 25, 2020   (CN) .......................... 202010726730.5

(51) Int. Cl.
*F28D 9/00*   (2006.01)
*B60H 1/00*   (2006.01)
(Continued)

(52) U.S. Cl.
CPC ....... *F28D 9/0093* (2013.01); *B60H 1/00328* (2013.01); *B60H 1/00342* (2013.01);
(Continued)

(58) Field of Classification Search
CPC .............. F28D 9/0093; B60H 1/00328; B60H 1/00342; B60H 1/3229; F28F 3/086;
(Continued)

(56) References Cited

U.S. PATENT DOCUMENTS 4,926,831 A     5/1990  Earl
9,945,623 B2 *  4/2018  Sheppard ................ F28D 9/005
(Continued)

FOREIGN PATENT DOCUMENTS

CN     102809311 A     12/2012
CN     103328914 A      9/2013
(Continued)

OTHER PUBLICATIONS

International Search Report dated Oct. 26, 2021 for PCT Appl. No. PCT/CN2021/107801.

*Primary Examiner* — Nelson J Nieves
(74) *Attorney, Agent, or Firm* — Ohlandt, Greeley and Perle, L.L.P.

(57)  ABSTRACT

A throttling heat exchange assembly includes a first heat exchange part, a bridge, a second heat exchange part, a throttling element, and a sensing element. The bridge is at least partially located between the first heat exchange part and the second heat exchange part. The bridge includes two holes and/or slots for communication facing towards the first heat exchange part. The bridge includes at least two holes or slots that allow communication with the second heat exchange part. The bridge is further provided with a first mounting part. The sensing element is fitted to the first
(Continued)

mounting part. A sensing head of the sensing element is located in an internal space of the bridge.

18 Claims, 21 Drawing Sheets

(51) Int. Cl.
*B60H 1/32* (2006.01)
*B60L 58/26* (2019.01)
*F28D 21/00* (2006.01)
*F28F 3/08* (2006.01)
*F28F 9/02* (2006.01)
*F28F 9/26* (2006.01)
*F28F 13/06* (2006.01)
*F28F 27/02* (2006.01)
*H01M 10/613* (2014.01)
*H01M 10/625* (2014.01)
*H01M 10/655* (2014.01)
*H01M 10/6567* (2014.01)
*B60K 1/00* (2006.01)
*B60K 11/02* (2006.01)
*F25B 39/02* (2006.01)

(52) U.S. Cl.
CPC ............ *B60H 1/3229* (2013.01); *B60L 58/26* (2019.02); *F28D 9/0037* (2013.01); *F28D 9/005* (2013.01); *F28D 9/0075* (2013.01); *F28F 3/086* (2013.01); *F28F 9/0253* (2013.01); *F28F 9/26* (2013.01); *F28F 13/06* (2013.01); *F28F 27/02* (2013.01); *H01M 10/613* (2015.04); *H01M 10/625* (2015.04); *H01M 10/655* (2015.04); *H01M 10/6567* (2015.04); *B60H 1/3227* (2013.01); *B60K 1/00* (2013.01); *B60K 2001/005* (2013.01); *B60K 11/02* (2013.01); *F25B 39/022* (2013.01); *F28D 2021/0084* (2013.01); *F28D 2021/0085* (2013.01); *Y02E 60/10* (2013.01); *Y02T 10/70* (2013.01)

(58) Field of Classification Search
CPC .. F28F 9/0253; F28F 9/26; F28F 13/06; F28F 27/02; H01M 10/613; H01M 10/625; H01M 10/655; H01M 10/6567
See application file for complete search history.

(56) References Cited

U.S. PATENT DOCUMENTS

| | | | |
|---|---|---|---|
| 11,153,994 B1 * | 10/2021 | Lo | ............................. F01P 3/20 |
| 2010/0243200 A1 | 9/2010 | Baker, Jr. et al. | |
| 2014/0013787 A1 | 1/2014 | Wesner et al. | |
| 2020/0149623 A1 * | 5/2020 | Muhammad | ............. F01P 11/08 |
| 2021/0325131 A1 * | 10/2021 | Tonellato | ................ F28D 9/005 |

FOREIGN PATENT DOCUMENTS

| | | |
|---|---|---|
| CN | 104315757 A | 1/2015 |
| CN | 107621182 A | 1/2018 |
| CN | 108068572 A | 5/2018 |
| CN | 108068581 A | 5/2018 |
| CN | 208186924 A | 12/2018 |
| CN | 110486974 A | 11/2019 |
| CN | 110953390 A | 4/2020 |

* cited by examiner

THROTTLING HEAT EXCHANGE ASSEMBLY

This application is the national phase of International Patent Application No. PCT/CN2021/107801, titled "THROTTLING HEAT EXCHANGE ASSEMBLY", filed on Jul. 22, 2021, which claims priority of Chinese Patent Application No. 202010726730.5, titled "HEAT EXCHANGE ASSEMBLY AND VEHICLE THERMAL MANAGEMENT SYSTEM", filed with the China National Intellectual Property Administration on Jul. 25, 2020, which are incorporated herein by reference in their entireties.

FIELD

The present application relates to the field of fluid control, and in particular to a throttling heat exchange assembly.

BACKGROUND

Some thermal management system includes no less than two heat exchangers, such as plate-type evaporators, and further includes a throttling element. These components are connected and fixed to other components of the system through pipelines. Due to the large number of components in the system, the piping connection of the system is relatively complicated.

SUMMARY

In order to provide a throttling heat exchange assembly which can be easily connected with the system, the following technical solution is provided according to the present application:

a throttling heat exchange assembly includes a first heat exchange portion, a bridge, a second heat exchange portion, and a throttling element, where at least part of the bridge is located between the first heat exchange portion and the second heat exchange portion, where the first heat exchange portion, the bridge and the second heat exchange portion are fixed by welding; the first heat exchange portion has a heat exchange core, and the first heat exchange portion includes at least two fluid flow passages which are not in communication; the throttling element is fixed or position-limited to the first heat exchange portion, or the throttling element is fixed or position-limited to the bridge;

the throttling heat exchange assembly includes a first connecting port, a second connecting port, and a third connecting port; the first heat exchange portion includes a first connecting port portion and a second connecting port portion; the first connecting port portion has the first connecting port, and the second connecting port portion has the second connecting port; the bridge includes two holes or grooves facing or close to the first heat exchange portion for communication; the bridge includes another at least two holes or grooves which are in communication with the second heat exchange portion, and openings of the another at least two holes or grooves of the bridge which are in communication with the second heat exchange portion face or are close to the second heat exchange portion; the bridge is further provided with a mounting portion, the throttling heat exchange assembly includes a sensing element, and the sensing element is cooperatively mounted on the mounting portion, where a sensing head of the sensing element is directed through the mounting portion, the sensing head is located in one hole and/or one groove of the bridge, and the hole and/or the groove where the sensing head is located is a flow passage or part of a flow passage from one hole passage of the first heat exchange portion to one hole passage of the second heat exchange portion.

The "communication through a flow passage" includes communication through a flow passage formed by a single component, and also includes communication through a flow passage formed by the combination of two or more components. The holes and/or grooves for communication includes multiple cases: holes for communication, grooves for communication, combination of holes and grooves, combination of holes, and combination of grooves, and the like. The holes and/or grooves which are in communication with the second heat exchange portion may be holes in communication with the second heat exchange portion, grooves in communication with the second heat exchange portion, or the combination of holes and grooves in communication with the second heat exchange portion. It is also the same for the holes and/or grooves which are in communication with the third connecting port. The communication here also includes direct communication and indirect communication. The bridge includes two holes or grooves facing or close to the first heat exchange portion for communication, the bridge further includes another at least two holes and/or grooves which are in communication with the second heat exchange portion, and the two holes or grooves facing or close to the first heat exchange portion for communication may also be used for communication with the second heat exchange portion. Further, if the holes or the grooves are in the form of through hole, these two through holes may face the first heat exchange portion and the second heat exchange portion, and be in communication with the second heat exchange portion. The description that two parts are in communication through a pipeline or something else is not a closed description herein, which means that the two are in communication, and further includes the case that there may be other component, such as a throttling element, a separator, a control valve, a one-way valve, or a heat exchanger between the two.

The fluid communication between the two heat exchange portions can be relatively conveniently realized through the arrangement of the bridge, and different system requirements can be realized by changing the structure of the bridge, so that the piping of the system is simple, the provision of pipelines between the connecting ports can be reduced, and the system connection is simple and convenient. Further, the mounting portion is arranged on the bridge to mount the sensing element, and the sensing head is located in the flow passage from the first heat exchange portion to the second heat exchange portion, so that the sensing element can easily sense or detect the relevant parameters of the fluid, such as a refrigerant, passing by.

DETAILED DESCRIPTION OF THE EMBODIMENTS

Figure 1:
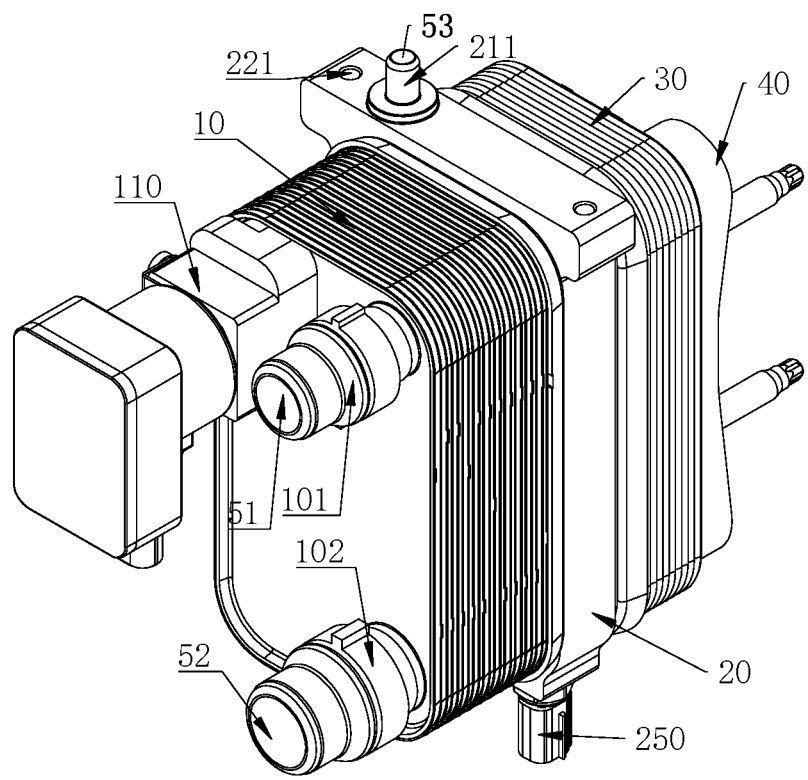
FIG. 1 and FIG. 2 are schematic perspective views of a first embodiment of a throttling heat exchange assembly provided according to the present application viewed from two perspectives.
Figure 2:
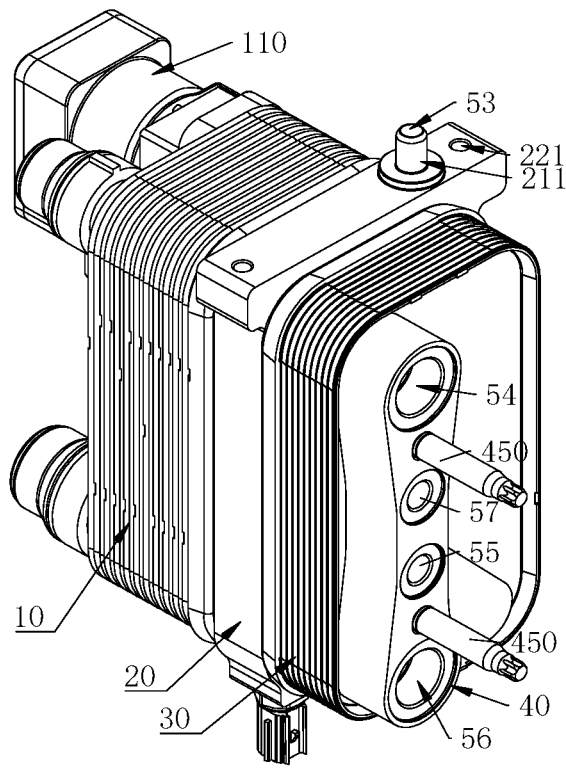
Figure 3:
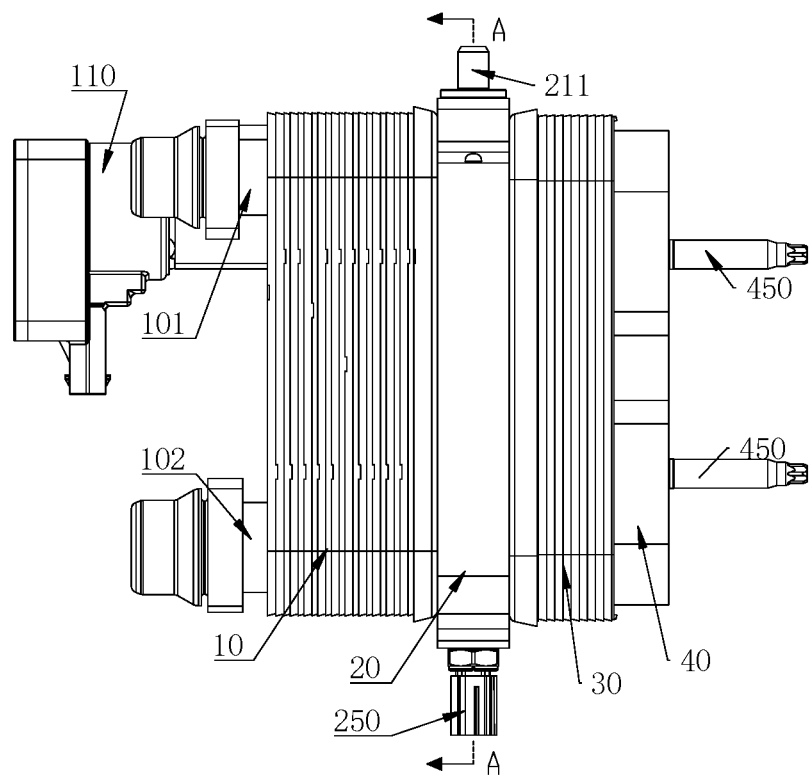
FIG. 3 is a schematic front view of the throttling heat exchange assembly shown in FIG. 1.
Figure 4:
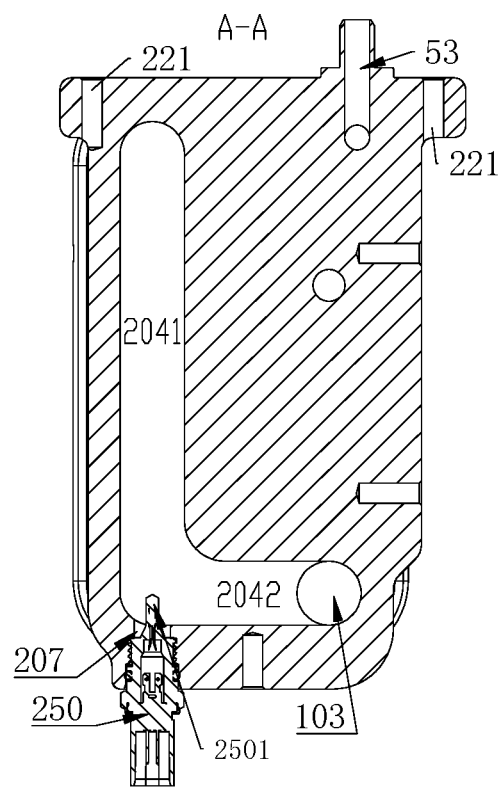
FIG. 4 is a schematic cross-sectional view of the throttling heat exchange assembly shown in FIG. 3 taken along line A-A.
Figure 5:
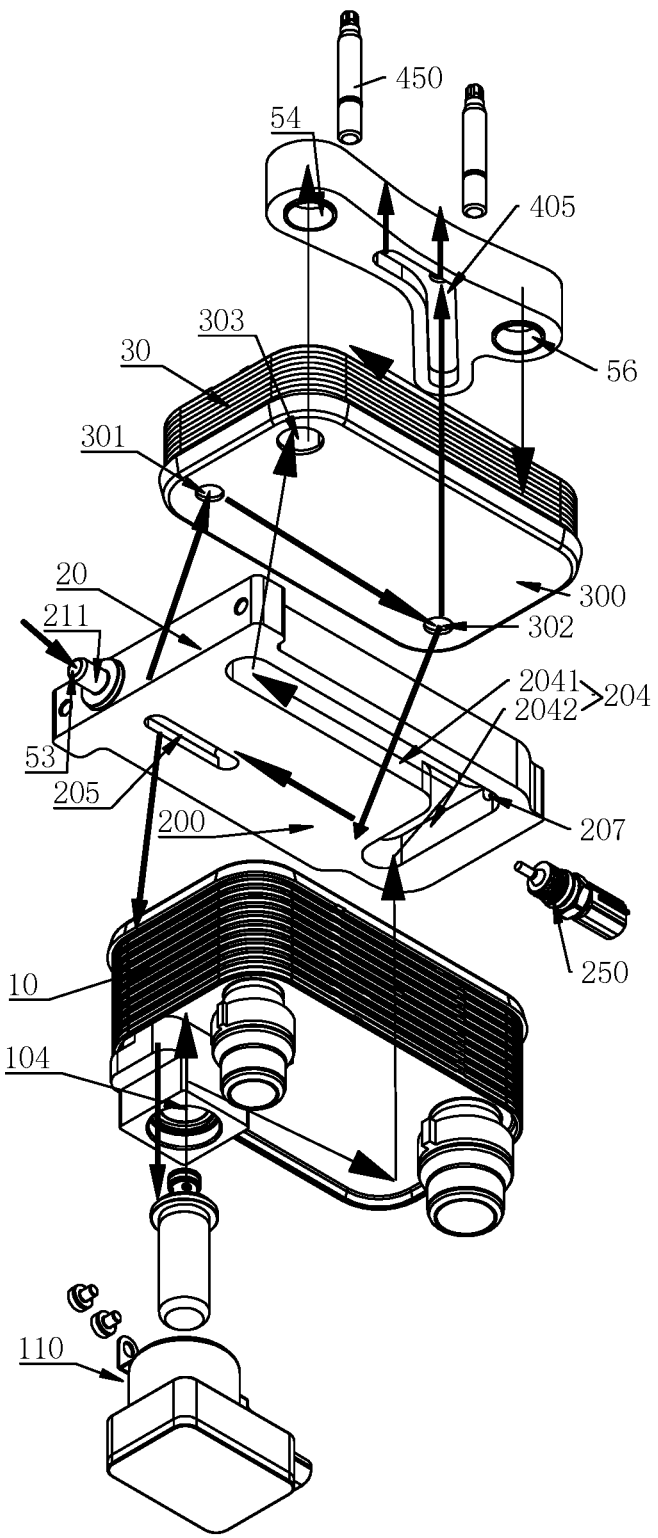
FIG. 5 is a schematic exploded view of the throttling heat exchange assembly.
Figure 6:
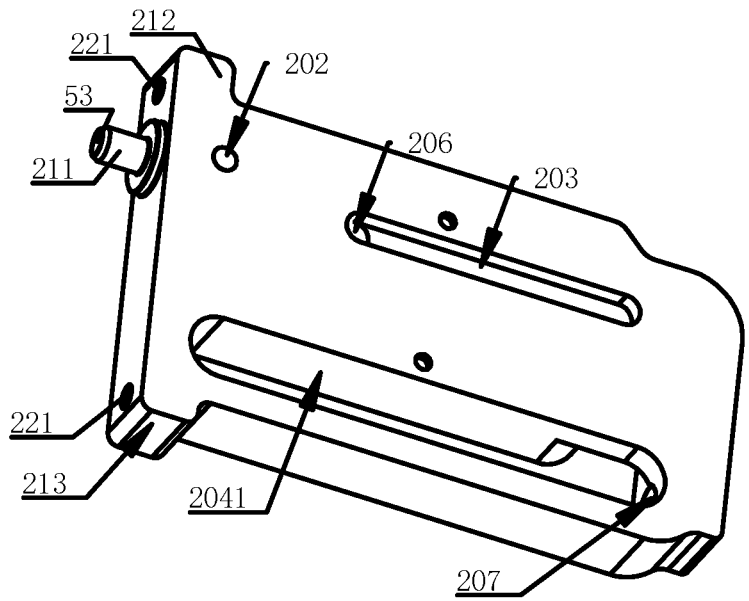
FIG. 6 is a schematic perspective view of a bridge of the throttling heat exchange assembly.
Figure 7:
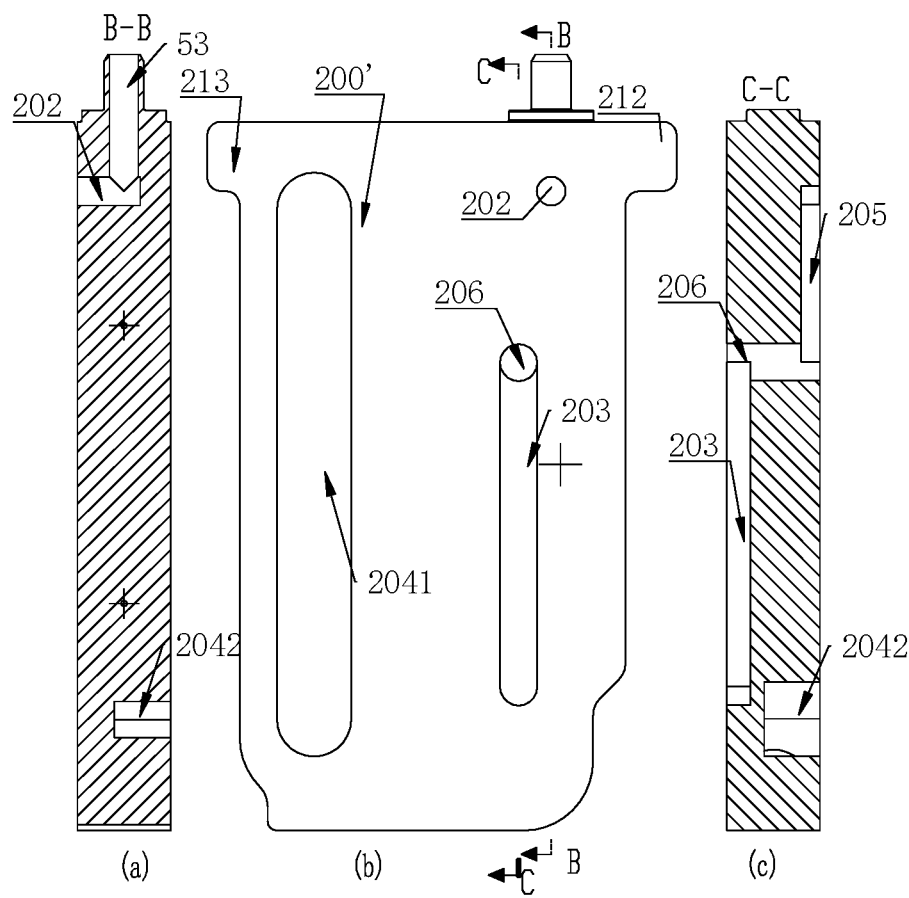
FIG. 7 shows a schematic front view of the bridge shown in FIG. 6, and also shows schematic cross-sectional views of the bridge shown in FIG. 6 taken along line B-B and line C-C.
Figure 8:
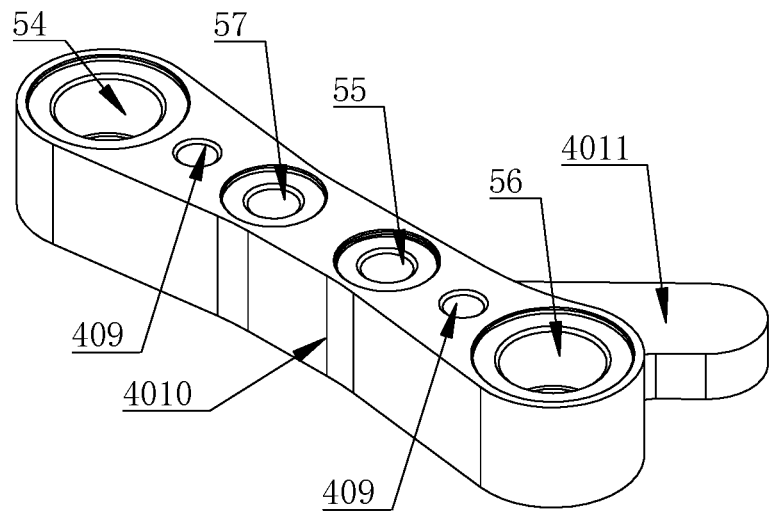
FIG. 8 and FIG. 9 are schematic perspective views of a connecting member of the throttling heat exchange assembly viewed from two perspectives.
Figure 9:
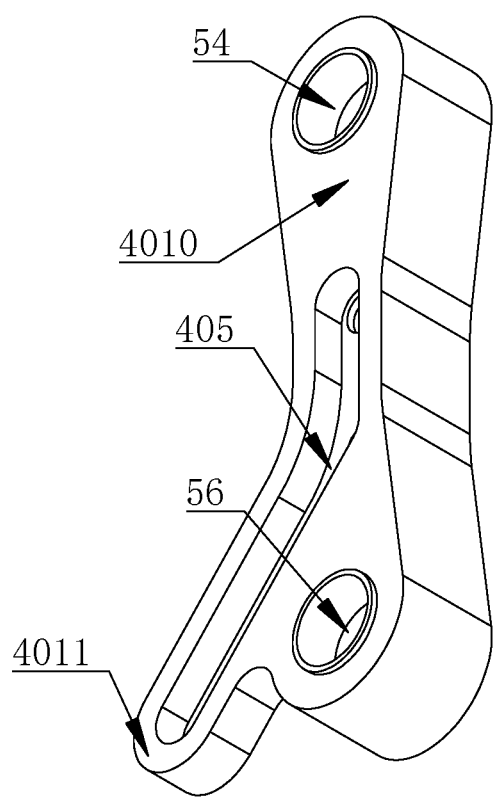

The technical solution is described below in conjunction with specific embodiments. Referring to FIGS. 1 to 9, FIG. 1 and FIG. 2 are schematic perspective views of a first embodiment of a throttling heat exchange assembly provided according to the present application viewed from two perspectives; FIG. 3 is a schematic front view of the throttling heat exchange assembly; FIG. 4 is a schematic cross-sectional view of the throttling heat exchange assembly shown in FIG. 3 taken along line A-A; FIG. 5 is a schematic exploded view of the throttling heat exchange assembly; FIG. 6 is a schematic perspective view of a bridge of the throttling heat exchange assembly; FIG. 7 shows a schematic front view of the bridge shown in FIG. 6, and also shows schematic cross-sectional views of the bridge shown in FIG. 6 taken along line B-B and line C-C; FIG. 8 and FIG. 9 are schematic perspective views of a connecting member of the throttling heat exchange assembly viewed from two perspectives. As shown in the figures, a throttling heat exchange assembly includes a first heat exchange portion 10, a throttling element 110, a bridge 20, a second heat exchange portion 30, and a connecting member 40. The bridge 20 is located between the first heat exchange portion 10 and the second heat exchange portion 30, and the connecting member 40 is located on another side of the second heat exchange portion 30, that is, the bridge 20 and the connecting member 40 are respectively arranged on two sides of the second heat exchange portion. The first heat exchange portion 10, the bridge 20, and the second heat exchange portion 30 are fixed by welding, or the first heat exchange portion 10, the bridge 20, the second heat exchange portion 30 and the connecting member are fixed by welding.

The first heat exchange portion 10 has a heat exchange core, the first heat exchange portion 10 has two flow passages through which fluids flow for heat exchange, and the two fluid flow passages are separated from each other. The first heat exchange portion 10 includes interlayer flow passages separated by stacked plates, and at least two kinds of fluids can flow through the first heat exchange portion 10. These two fluids can exchange heat in the first heat exchange portion, for example, one fluid is a refrigerant, and the other fluid may be a coolant for cooling heating elements such as a battery. In addition, the first heat exchange portion may also be used for three fluids. For example, one fluid is a refrigerant, and the other two fluids may be coolants. The two coolants may be controlled to selectively exchange heat with the refrigerant, and then the coolants can be used to cool the components that need to be cooled after the coolants are cooled by heat exchange. The following is described with two fluids flowing through the first heat exchange portion as an example.

The throttling heat exchange assembly has a first connecting port 51, a second connecting port 52, a third connecting port 53, a fourth connecting port 54, a fifth connecting port 55, a sixth connecting port 56, and a seventh connecting port 57. In this embodiment, the first heat exchange portion is provided with the first connecting port 51 and the second connecting port 52, the bridge 20 is provided with the third connecting port 53, and the connecting member 40 is provided with the fourth connecting port 54, the fifth connecting port 55, the sixth connecting port 56, and the seventh connecting port 57. The throttling element 110 is fixed or position-limited to the first heat exchange portion 10, where the first heat exchange portion 10 has four hole passages, such as a first hole passage 103 and a second hole passage 104 (not all shown in the figure). The first heat exchange portion 10 is further provided with a pipe with a communication port 105 in the hole passage 104, and the communication port 105 is in communication with the throttling element 110. The first heat exchange portion 10 includes a first connecting port portion 101 and a second connecting port portion 102, the first connecting port portion 101 has the first connecting port 51 which is configured to communicate with the coolant, the second connecting port portion 102 has the second connecting port 52 which is configured to communicate with the coolant, and the first connecting port 51 is in communication with the second connecting port 52 through a flow passage of the heat exchange core, where the first connecting port portion 101 and the second connecting port portion 102 may be a part of a side plate of the first heat exchange portion 10, or may be separately processed and fixed to a side plate of the first heat exchange portion 10 and/or the heat exchange core by welding, or the first connecting port portion and the second connecting port portion may be fixed to the first heat exchange portion by pipe joints.

The bridge 20 has a first cooperation portion 200 and a second cooperation portion 200'. Correspondingly, the first heat exchange portion 10 has a cooperation portion 100. The cooperation portion 100 of the first heat exchange portion 10 correspondingly cooperates with the first cooperation portion 200 of the bridge 20. The second heat exchange portion 30 has a cooperation portion 300, and the cooperation portion 300 correspondingly cooperates with the second cooperation portion 200' of the bridge 20. The cooperation portion 100 of the first heat exchange portion 10, the cooperation portion 300 of the second heat exchange portion 30 and the two cooperation portions of the bridge 20 each include a flat surface portion. An opening of a hole, a groove or a conducting portion for communication, arranged on a side, where the first cooperation portion 200 is located, of the bridge 20 is located inside the first cooperation portion 200, and each opening for communication is surrounded by the first cooperation portion 200, and the first heat exchange portion 10 has a respective opening for communication corresponding to each opening for communication of the bridge 20 in position, and each opening for communication of the first heat exchange portion 10 is located in the cooperation portion 100 thereof and each opening for communication thereof is surrounded by the cooperation portion 100. Thus, after the cooperation portion 100 of the first heat exchange portion 10 and the first cooperation portion 200 of the bridge 20 are welded and sealed, each opening for communication of the bridge 20 is in communication with the corresponding opening for communication of the first heat exchange portion 10, or in other words, each of the first heat exchange portion 10 and the bridge 20 includes a part of the corresponding cooperation portion thereof around each opening for communication thereof, and the two form a substantially closed structure at the cooperation portions which are arranged oppositely. The cooperation portion 300 of the second heat exchange portion 30 corresponds to the second cooperation portion 200' of the bridge in position. Each opening for communication on a side, facing the second heat exchange portion 30, of the bridge 20 is in communication with a corresponding opening for communication of the second heat exchange portion 30 after the second cooperation portion 200' of the bridge 20 and the cooperation portion 300 of the second heat exchange portion 30 are welded and sealed. Specifically, the second heat exchange portion 30 has openings of three hole passages on a side facing the bridge 20: openings of a third hole passage 301, a fourth hole passage 302 and a first hole passage 303. The bridge 20 has an opening of a guiding hole 202, an opening of a first groove 203, and an opening of a hole 2041 of a guiding portion 204 on a side facing the second heat exchange portion 30, that is, on the second cooperation portion 200'. The opening of the third hole passage 301 of the second heat exchange portion 30 corresponds to the opening of the guiding hole 202 in position, the opening of the fourth hole passage 302 corresponds to the opening of the first groove 203 in position, and the opening of the first hole passage 303 corresponds to the opening of the hole 2041 of the guiding portion 204 in position. The opening of the hole 2041 is arranged to extend substantially up and down, and the opening of the first groove 203 is arranged to extend substantially up and down.

The orientations terms herein such as "up" and "down" are for the purpose of clarity and should not be regarded as a limitation, which corresponds to a height direction accordingly. The holes herein include but are not limited to through holes and blind holes. A shape of the hole may be circular or non-circular. The groove is generally a non-through groove, but the groove may also be a groove most of which is non-through and part of which is through.

The bridge 20 further includes a third connecting port portion 211. The third connecting port portion 211 has the third connecting port 53. The third connecting port portion 211 has a structure which protrudes outward. The third connecting port portion 211 may have a structure integrated with a main body of the bridge 20, or may have a structure that is processed separately and fixed to a main body of the bridge 20 by welding. In addition, the bridge 20 is provided with a through hole 206, the first groove 203 has a blind-hole-like structure extending up and down, and the through hole 206 is defined on a side, relatively close to the third connecting port portion 211, of the first groove 203. The bridge 20 is provided with a second groove 205 on a side where the first cooperation portion 200 is located, the second groove 205 has a blind-hole-like structure extending up and down, and the through hole 206 is located on a side, relatively away from the third connecting port portion 211, of the second groove 205. The first groove 203 is in communication with the second groove 205 through the through hole 206, or in other words, an extended end of the first groove 203 is the through hole 206 or a part of the through hole 206, and an extended end of the second groove 205 is the through hole 206 or a part of the through hole 206, as shown in FIG. 7. The guiding hole 202 is similar to a blind hole, the opening of the guiding hole 202 is on the side where the second cooperation portion is located, and the guiding hole 202 is in communication with the third connecting port 53. A depth of the guiding hole 202 is greater than or equal to one half of a thickness of the bridge 20, or a depth of the guiding hole 202 is about one half of a thickness of the bridge 20, such as larger than or equal to one third of the thickness of the bridge 20 and less than two thirds of the thickness of the bridge 20. The guiding portion 204 includes a hole 2032 and a groove 2042, where the hole 2032 is similar to a through hole, the groove 2042 is similar to a blind hole, and an opening of the groove 2042 is arranged on a side where the first cooperation portion 200 is located. Herein, a side, facing the first heat exchange portion 10, of the bridge 20 is defined as a front side, and a side, facing the second heat exchange portion 30, of the bridge 20 is defined as a rear side. In this embodiment, a side on which the first groove 203 is defined is defined as the front side, and a side on which the second groove 205 is defined is defined as the rear side. At least part of a projection of the first groove 203 onto the front side is located in the groove 2042 of the guiding portion 204, and at least part of a projection of the guiding hole 202 onto the front side is located in the second groove 205, that is, at least part of the guiding hole 202 faces away from and is not in direct communication with the second groove 205, and at least part of the first groove 203 faces away from and is not in direct communication with the groove 2042.

The connecting member 40 includes a main body portion 4010 and an extension portion 4011. The connecting member 40 is provided with the fourth connecting port 54, the fifth connecting port 55, the sixth connecting port 56 and the seventh connecting port 57, and is further provided with a fixing hole 409 for fixing or position-limiting. The connecting member 40 has a groove 405 on a side facing the second heat exchange portion 30, and the groove 405 has a blind-hole-like structure. The seventh connecting port 57 is arranged at a part, relatively close to the fourth connecting port 54, of the groove 405, the fifth connecting port 55 is arranged at the substantially middle of the groove 405, the fifth connecting port 55 is in communication with the groove 405, and the seventh connecting port 57 is in communication with the groove 405. The connecting member 40 may further include a fixing member 450 for fixing or position-limiting, and the fixing member 450 may be fixed or position-limited to the fixing hole 409.

The throttling heat exchange assembly can facilitate the mounting and connection of the thermal management system, reduce the number of connected pipes, and reduce the volume of the system. The throttling heat exchange assembly used in the vehicle thermal management system is taken as an example for description. It should be noted that, these components are fixed during actual use. For the sake of clarity, the flow of the refrigerant is shown in the exploded view, which is only for clarity and description. In a specific vehicle thermal management system, the vehicle thermal management system includes a refrigerant system and a battery thermal management system. Referring to FIG. 5 and other views, the battery thermal management system includes the first connecting port portion 101 and the second connecting port portion 102 of the throttling heat exchange assembly, and the flow passage, in communication with the first connecting port 51 and the second connecting port 52, of the first heat exchange portion 10. The heat of the battery can be transferred to the coolant. The coolant flows through the flow passage of the first heat exchange portion 10 from the first connecting port 51 or the second connecting port 52, and exchanges heat in the first heat exchange portion 10 with a refrigerant in another flow passage, so that the coolant is cooled and then flows back to cool the battery. The third connecting port 53, the fourth connecting port 54, the fifth connecting port 55, the sixth connecting port 56 and the seventh connecting port 57 are respectively in communication with the refrigerant system. For example, the refrigerant cooled by a condenser enters the throttling heat exchange assembly from the third connecting port 53, or the refrigerant flowing through a liquid reservoir enters the throttling heat exchange assembly from the third connecting port 53, so that the high-temperature and high-pressure refrigerant enters the third hole passage 301 of the second heat exchange portion 30 through the guiding hole 202, and then flows into the fourth hole passage 302 after exchanging heat in the second heat exchange portion 30 with the refrigerant in another flow passage, and the refrigerant flowing into the fourth hole passage 302 is divided into two parts: one part flows through a flow passage formed by the connecting member 40 and the second heat exchange portion 30 and also formed by a space where the groove 405 is located, and flows out from the fifth connecting port 55 and the seventh connecting port 57, for example, this part flows to a front evaporator from the fifth connecting port 55 and flows to a rear evaporator from the seventh connecting port 57, or flows to a rear evaporator from the fifth connecting port 55 and flows to a front evaporator from the seventh connecting port 57, where the throttling element 110 may be arranged before the front evaporator or the rear evaporator; the other part of the refrigerant flows through a flow passage formed by the bridge and the cooperation portion of the second heat exchange portion 30 and also formed by a space where the first groove 203 is located, flows through the through hole 206, flows through a flow passage formed by the bridge 20 and the cooperation portion 100 of the first heat exchange portion and also formed by a space where the second groove 205 is located, flows into the throttling element 110 through the communication port which is in communication with the throttling element 110, and then flows into the hole passage of the first heat exchange portion 10 after being throttled by the throttling element 110, and then exchanges heat in the refrigerant flow passage of the first heat exchange portion 10 with the coolant in the coolant flow passage, then reaches the first hole passage 103, then reaches the first hole passage 303 of the second heat exchange portion 30 through a flow passage formed by the bridge 20, the first heat exchange portion 10 and the second heat exchange portion 30 and also formed by the guiding portion 204, and then flows out from the fourth connecting port 54 which is in communication with the first hole passage 303, and then, for example, flows into to a compressor. In addition, the sixth connecting port 56 may be configured to introduce the refrigerant flowing back from the front evaporator and/or the rear evaporator, this low-temperature refrigerant flows into the first hole passage 303 through the second hole passage 304 of the second heat exchange portion 30, and exchanges heat with the high-temperature refrigerant flowing from the third hole passage 301 into the fourth hole passage 302, and the two refrigerants converge in the first hole passage 303 and flow back to the compressor through the fourth connecting port 54, so that the low-temperature refrigerant is used to cool the high-temperature refrigerant, which can lower the condensing temperature of the refrigerant and prevent the temperature of the refrigerant returning to the compressor from being excessively high. The flow direction herein is only for illustration and should not be construed as restriction or closed requirement, and other components can be added in it, such as adding other control valves before the compressor. The bridge 20 is further provided with a first mounting portion 207 for mounting a sensing element 250, such as a temperature sensing element. A sensing head 2501 for sensing temperature is directed through the first mounting portion 207 and located in the flow passage where the guiding portion 204 is located, so that a temperature of the refrigerant flowing through the first heat exchange portion 10 or an outlet temperature of the evaporator can be obtained.

Figure 10:
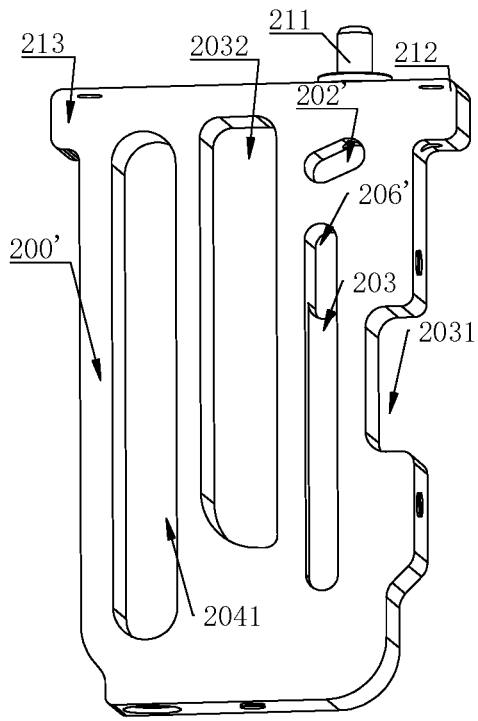
FIG. 10 and FIG. 11 are schematic perspective views of another embodiment of the bridge of the above throttling heat exchange assembly.
Figure 11:
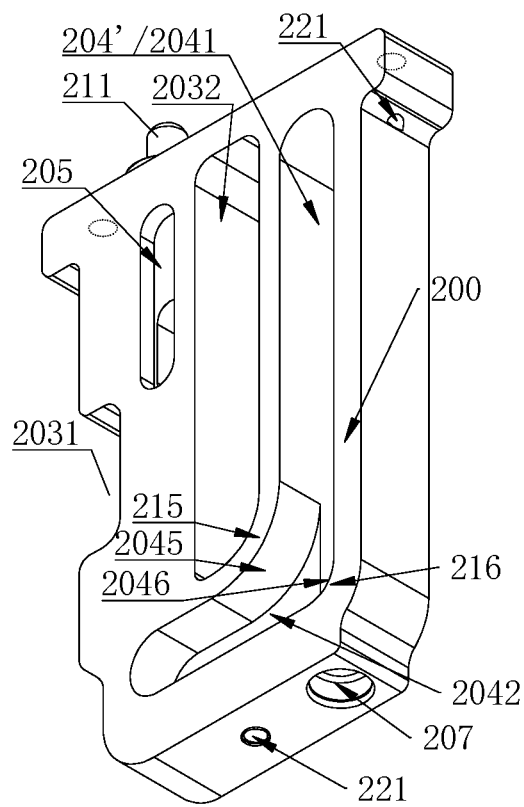
Figure 12:
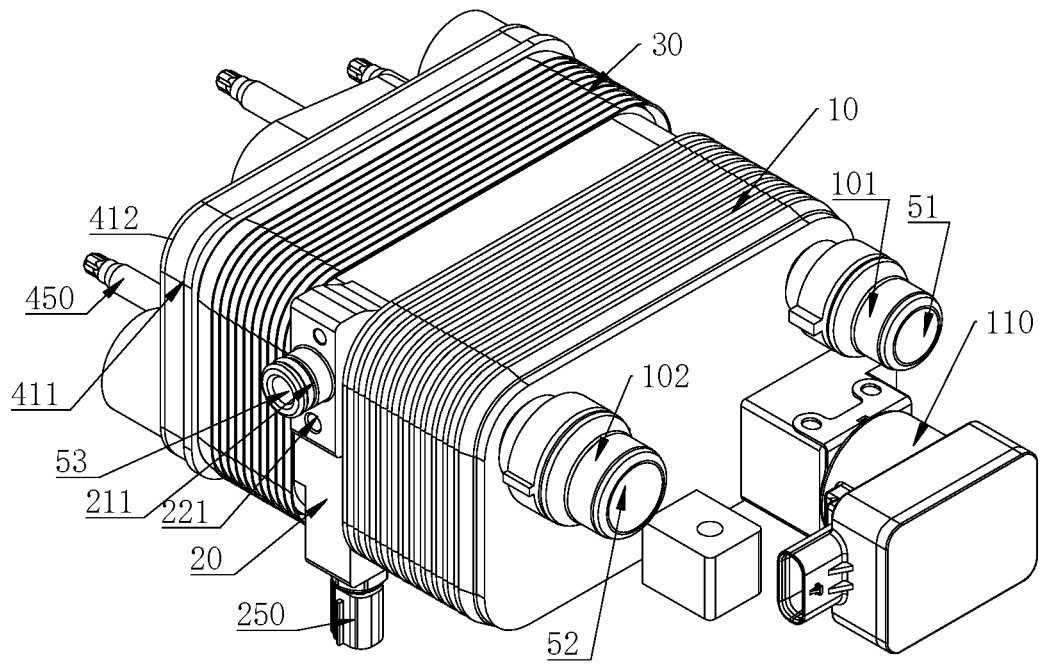
FIG. 12 and FIG. 13 are schematic perspective views of a second embodiment of the throttling heat exchange assembly viewed from two perspectives.
Figure 13:
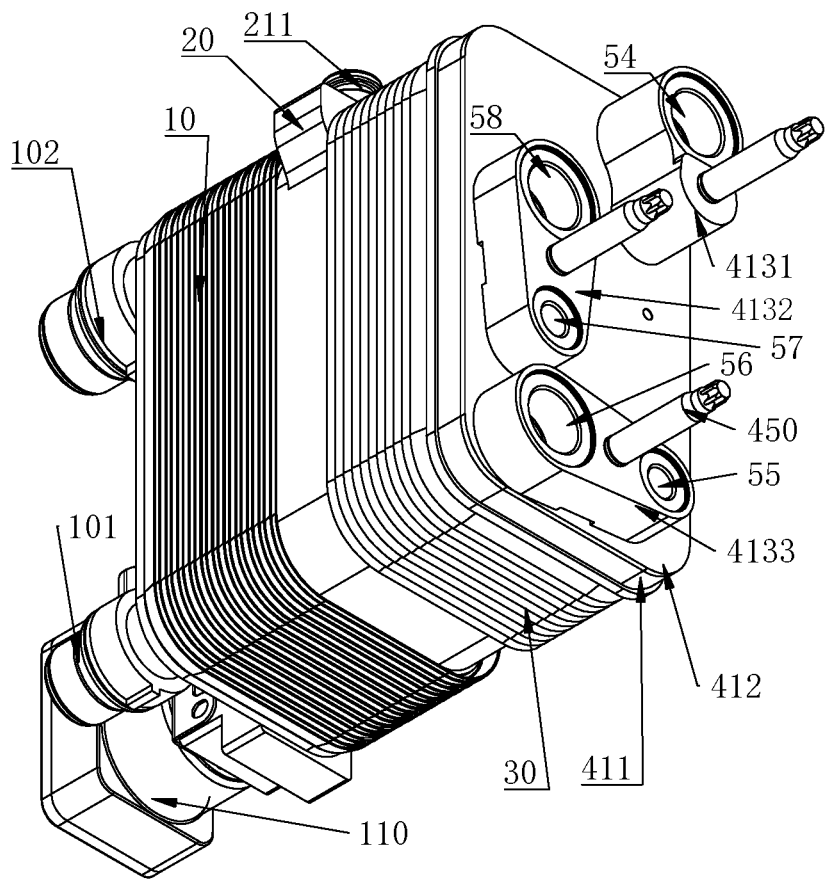

The throttling heat exchange assembly can realize the heat exchange between the high-temperature refrigerant and part of the low-temperature refrigerant, lower the temperature of the high temperature refrigerant, and prevent the temperature of the refrigerant returning to the compressor from being excessively high, thereby improving the efficiency. In addition, the pipelines between the connecting ports can be reduced, and the connection of the system is simple and convenient. In addition, in order to further reduce the weight, the bridge 20 may be embodied as shown in FIG. 10 and FIG. 11, where the bridge 20 is improved based on the above embodiment, a portion is removed in the middle of the bridge 20 to form a hole 2032, and a shape of the hole 2032 may be irregular and be formed by removing materials according to the needs of welding. The hole is a through hole, a distance between the through hole 2032 and the second groove 205, facing the first heat exchange portion 10 for communication, of the bridge 20 is greater than or equal to 1.5 mm, a distance between the through hole 2032 and the guiding portion 204, facing the first heat exchange portion 10 for communication, of the bridge 20 is greater than or equal to 1.5 mm; and a distance between the through hole 2032 and a hole 202', facing the second heat exchange portion 30 for communication, of the bridge is greater than or equal to 1.5 mm, where the hole 202' is a guiding hole. A distance between the through hole 2032 and the first groove 203, facing the second heat exchange portion 30 for communication, of the bridge 20 is greater than or equal to 1.5 mm, and a distance between the through hole 2032 and the hole 2041, facing the second heat exchange portion 30 for communication, of the bridge 20 is greater than or equal to 1.5 mm. In other words, the distances are widths of cooperation portions of the bridge 20 respectively for cooperating with the first heat exchange portion 10 and the second heat exchange portion 30 for welding. However, the weight-reducing holes do not have to be through holes. For example, two sides of the bridge 20 are recessed inward to form blind holes or grooves on the two sides, which can also reduce weight and facilitate welding. However, through holes are more suitable for processing. In addition, a part is removed on one side of the bridge to form a recess, that is, a notch 2031, so that an area of the first cooperation portion 200 of the bridge 20 for cooperating with the first heat exchange portion 10 is reduced, and similarly an area of the second cooperation portion 200' for cooperating with the second heat exchange portion 30 is also reduced. In this way, an area for cooperative welding can be reduced, which is beneficial to improving the welding quality, and reducing the weight. The bridge 20 has a first wall portion 215 and a second wall portion 216 at the intersection of the hole 2032 and the groove 2042. A surface, facing the guiding portion, of the first wall portion 215 forms a first wall surface 2045 with a smooth transition, and a surface, facing the guiding portion, of the second wall portion 216 forms a second wall surface 2046 with a smooth transition. A flow passage is formed by the bridge 20, the first heat exchange portion 10, and the second heat exchange portion 30, and is also formed by the guiding portion 204'. A flow resistance of the refrigerant flowing through the flow passage can be reduced when the refrigerant turns due to the smooth transition part. The non-circular guiding hole 202' extends laterally, which is more convenient to cooperate with the flow of refrigerant.

Figure 14:
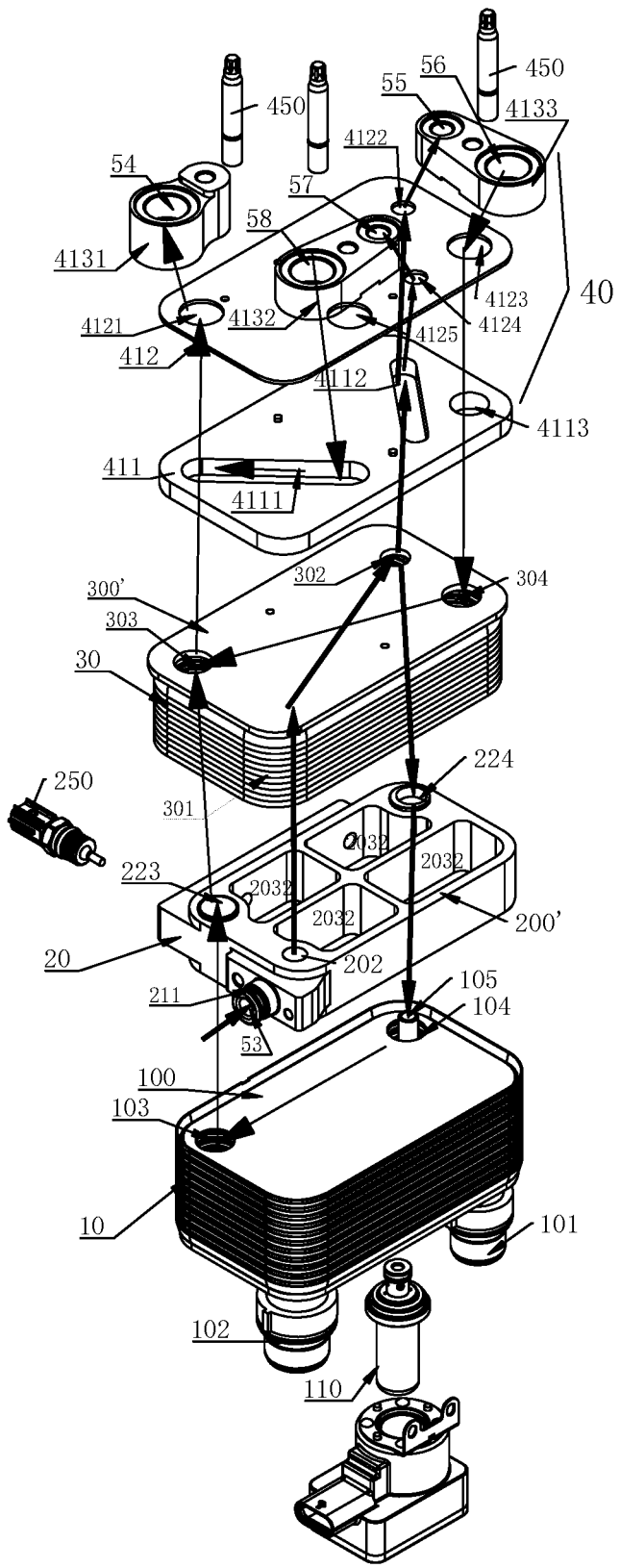
FIG. 14 is a schematic exploded view of the throttling heat exchange assembly shown in FIG. 12.
Figure 15:
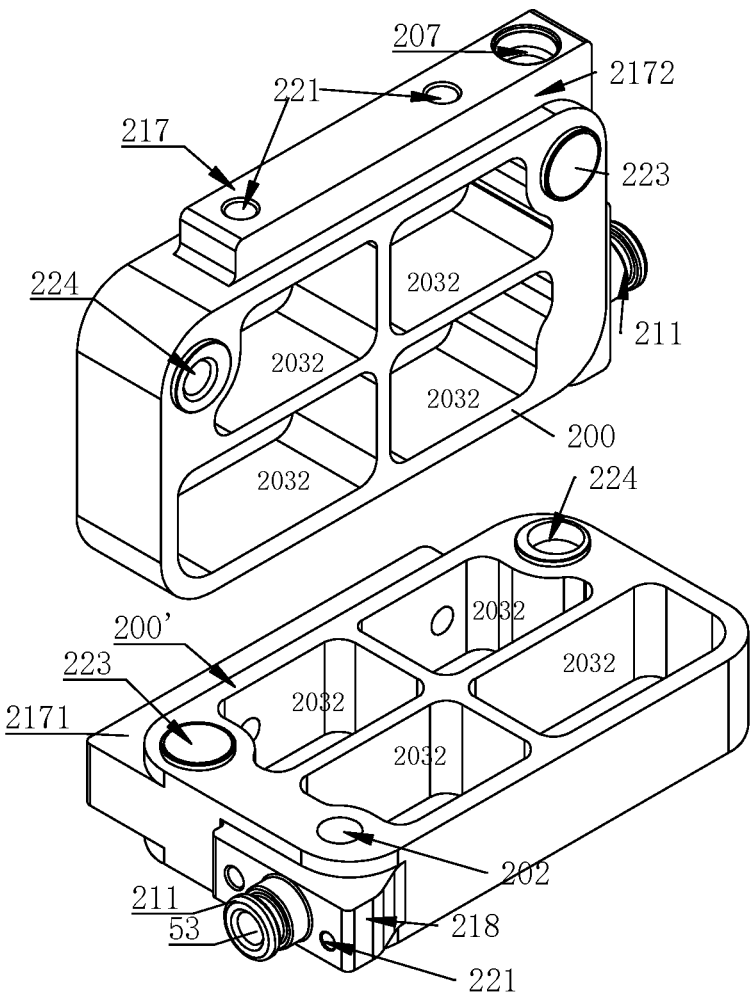
FIG. 15 shows two perspective views of the bridge of the throttling heat exchange assembly shown in FIG. 12 viewed from two perspectives.
Figure 16:
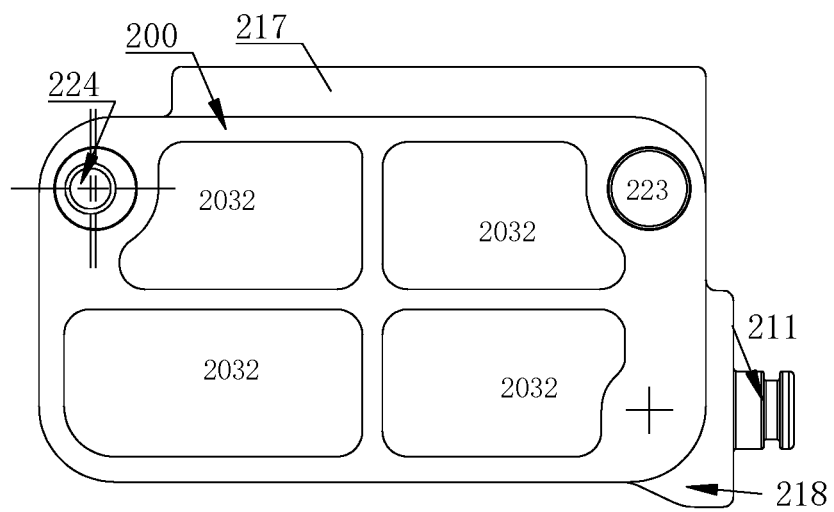
FIG. 16 is a schematic front view of the bridge shown in FIG. 15.
Figure 17:
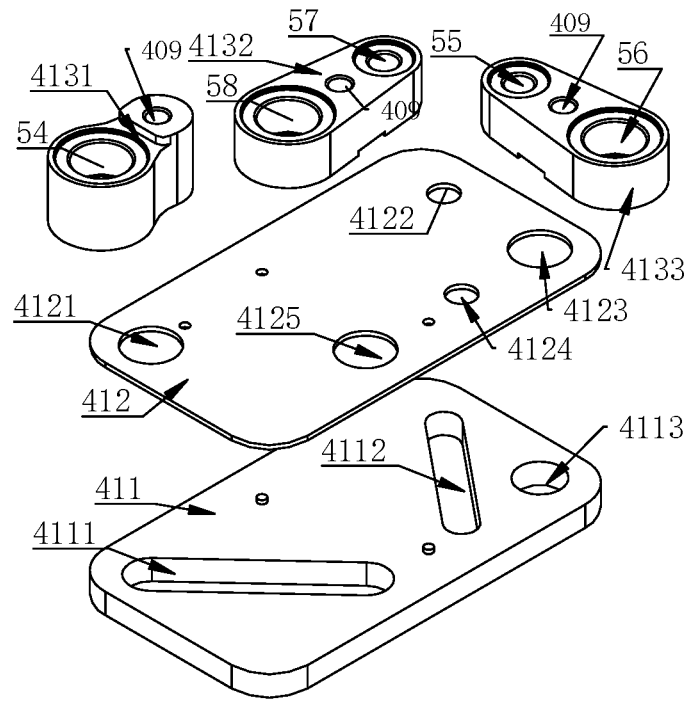
FIG. 17 is a schematic exploded view of the connecting member of the throttling heat exchange assembly shown in FIG. 12.
Figure 18:
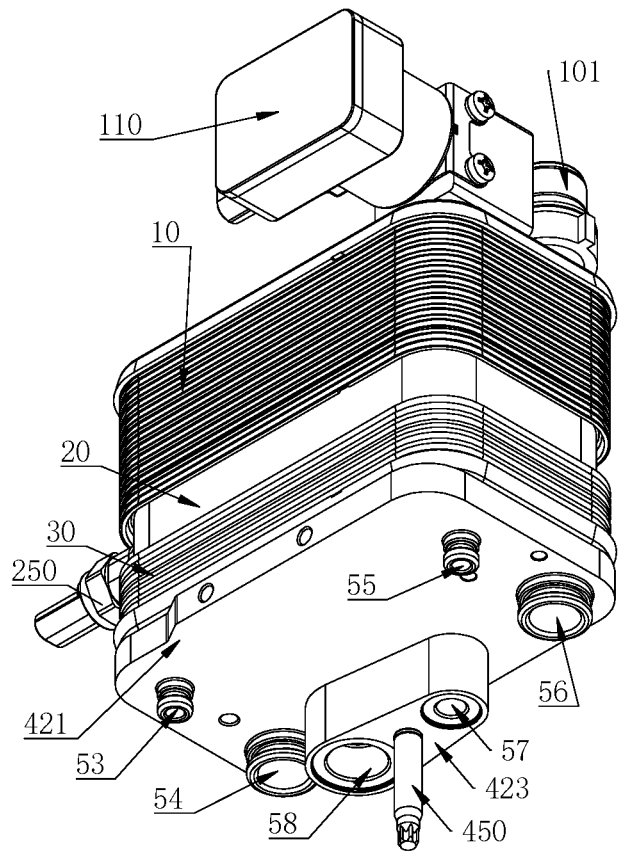
FIG. 18 and FIG. 19 are schematic perspective views of a third embodiment of the throttling heat exchange assembly viewed from two perspectives.
Figure 19:
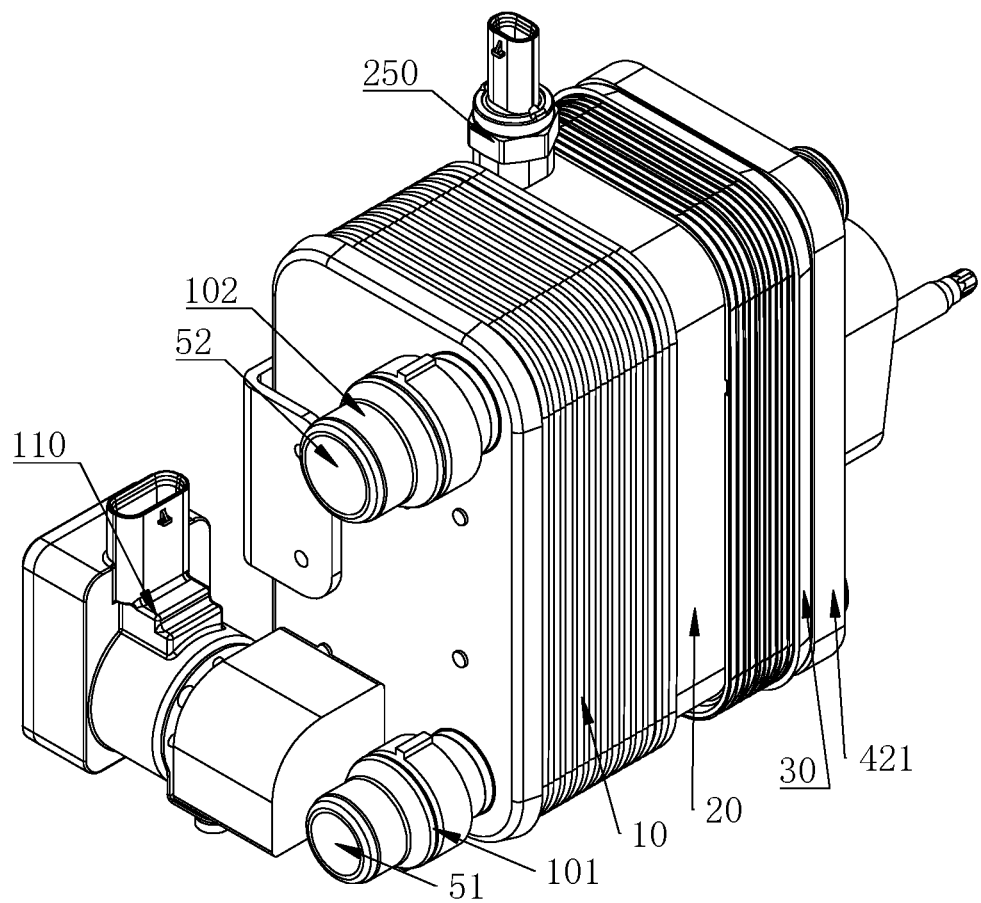

A second embodiment of the throttling heat exchange assembly is described below. Referring to FIGS. 12 to 17, FIG. 12 and FIG. 13 are schematic perspective views of a second embodiment of the throttling heat exchange assembly viewed from two perspectives; FIG. 14 is a schematic exploded view of the throttling heat exchange assembly; FIG. 15 shows two perspective views of the bridge of the throttling heat exchange assembly viewed from two perspectives; FIG. 16 is a schematic front view of the bridge shown in FIG. 15; and FIG. 17 is a schematic exploded view of the connecting member of the throttling heat exchange assembly shown in FIG. 12. The throttling heat exchange assembly includes a first heat exchange portion 10, a bridge 20, a second heat exchange portion 30, and a connecting member. The throttling heat exchange assembly has a first connecting port 51, a second connecting port 52, a third connecting port 53, a fourth connecting port 54, a fifth connecting port 55, a sixth connecting port 56, a seventh connecting port 57, and an eighth connecting port 58. The bridge 20 is provided with a third connecting port portion 211. The throttling element 110 is fixed or position-limited to the first heat exchange portion 10, where the first heat exchange portion 10 has four hole passages, such as a first hole passage 103 and a second hole passage 104 (not all shown in the figure). The first heat exchange portion 10 includes a first connecting port portion 101 and a second connecting port portion 102, the first connecting port portion 101 has the first connecting port 51 which is configured to communicate with the coolant, the second connecting port portion 102 has the second connecting port 52 which is configured to communicate with the coolant, and the first connecting port 51 is in communication with the second connecting port 52 through a flow passage of the heat exchange core, where the first connecting port portion 101 and the second connecting port portion 102 may be a part of a side plate of the first heat exchange portion 10, or may be separately processed and fixed to a side plate of the first heat exchange portion 10 and/or the heat exchange core by welding.

The bridge 20 has a first cooperation portion 200, and the first heat exchange portion 10 has a cooperation portion 100 which is configured to cooperate with the first cooperation portion 200 of the bridge 20, where the first cooperation portion 200 and the cooperation portion 100 of the first heat exchange portion 10 face and cooperate with each other. The cooperation portion 100 of the first heat exchange portion 10 and the first cooperation portion 200 of the bridge 20 each include a flat surface portion. An opening of a hole, a groove or a conducting portion for communication, arranged on a side, where the first cooperation portion 200 is located, of the bridge 20 is located inside the first cooperation portion 200, and each opening for communication is surrounded by the first cooperation portion 200, and the first heat exchange portion 10 has a respective opening for communication corresponding to each opening for communication of the bridge 20 in position, and each opening for communication of the first heat exchange portion 10 is located in the cooperation portion 100 thereof and each opening for communication thereof is surrounded by the cooperation portion 100. In other words, the first heat exchange portion 10 and the bridge 20 each have a substantially closed structure at the cooperation portions which are arranged oppositely. Thus, after the cooperation portion 100 of the first heat exchange portion 10 and the first cooperation portion 200 of the bridge 20 are welded and sealed, each opening for communication of the bridge 20 is in communication with the corresponding opening for communication of the first heat exchange portion 10. Specifically, the first heat exchange portion 10 has an opening of the first hole passage 103 and a communication port 105 of the pipeline in communication with the throttling element on a side facing the bridge 20, the bridge 20 correspondingly has a hole 223 and a hole 224 on a side facing the first heat exchange portion 10, an opening of the hole 223 corresponds to the opening of the hole passage 103 of the first heat exchange portion 10 in position, and an opening of the hole 224 corresponds to the communication port 105 which is in communication with the throttling element in position, where the hole 223 and the hole 224 are through holes.

The bridge 20 has a second cooperation portion 200', and the second cooperation portion 200' faces the second heat exchange portion 30. The second heat exchange portion 30 has a cooperation portion 300. The cooperation portion 300 of the second heat exchange portion 30 and the second cooperation portion 200' of the bridge 20 each include a flat surface portion. An opening of a hole, a groove or a conducting portion for communication, arranged on a side, where the second cooperation portion 200' is located, of the bridge 20 is located inside the second cooperation portion 200', and each opening for communication is surrounded by the second cooperation portion 200', and the second heat exchange portion 30 has a respective opening for communication corresponding to each opening for communication of the bridge 20 in position, and each opening for communication of the second heat exchange portion 30 is located in the cooperation portion 300 thereof and each opening for communication thereof is surrounded by the cooperation portion 300. In other words, each of the second heat exchange portion 30 and the bridge 20 includes a part of the corresponding cooperation portion thereof around each opening for communication thereof, and the two form a substantially closed structure at the cooperation portions which are arranged oppositely. The cooperation portion 300 of the second heat exchange portion 30 corresponds to the second cooperation portion 200' of the bridge in position. Each opening for communication on a side, facing the second heat exchange portion 30, of the bridge 20 is in communication with a corresponding opening for communication of the second heat exchange portion 30 after the second cooperation portion 200' of the bridge 20 and the cooperation portion 300 of the second heat exchange portion 30 are welded and sealed. Specifically, the second heat exchange portion 30 has openings of three hole passages on a side facing the bridge 20: openings of a third hole passage 301, a fourth hole passage 302 and a first hole passage 303. The bridge 20 has an opening of a guiding hole 202, an opening of the hole 223, and an opening of the hole 224 on a side facing the second heat exchange portion 30, that is, on the second cooperation portion. The opening of the third hole passage 301 of the second heat exchange portion 30 corresponds to the opening of the guiding hole 202 in position, the opening of the fourth hole passage 302 corresponds to the opening of the hole 224 in position, and the opening of the first hole passage 303 corresponds to the opening of the hole 223 in position. The bridge 20 further includes a third connecting port portion 211. The third connecting port portion 211 has the third connecting port 53. The third connecting port portion 211 has a structure which protrudes outward. The third connecting port portion 211 may have a structure integrated with a main body of the bridge 20, or may have a structure that is processed separately and fixed to a main body of the bridge 20 by welding. The bridge 20 is provided with four holes 2032. The holes 2032 are non-circular through holes, and may also be circular. The guiding hole 202 is similar to a blind hole, the opening of the guiding hole 202 is on the side where the second cooperation portion is located, and the guiding hole 202 is in communication with the third connecting port 53. The bridge 20 further includes a protruding portion 217 and a second protruding portion 218, where the protruding portion 217 is arranged to protrude substantially transversely along the main body, the second protruding portion 218 is arranged to protrude outward from a corner of the main body, a first side surface 2171 of the protruding portion 217 is lower than the second cooperation portion 200' of the bridge 20, and a second side surface 2172 of the protruding portion 217 is lower than the first cooperation portion 200 of the bridge. Similarly, two side surfaces of the second protruding portion 218 are correspondingly lower than the cooperation portions on corresponding two sides of the bridge 20; or in other words, a thickness of the protruding portion 217 is smaller than a thickness of the main body of the bridge, and a thickness of the second protruding portion 218 is smaller than the thickness of the main body of the bridge. By providing the protruding portion 217 and the second protruding portion 218, the size of the main body of the bridge 20 can be reduced, so that at least part of a fixing hole 221 is defined in the protruding portion 217 and/or the second protruding portion 218, and at least part of the third connecting port portion 211 is located on the second protruding portion 218, thereby reducing the size of the main body.

The connecting member includes a connecting block 411, a connecting plate 412, a first connecting pipe cooperation portion 4131, a second connecting pipe cooperation portion 4132, and a third connecting pipe cooperation portion 4133. The connecting block 411, the connecting plate 412, the first connecting pipe cooperation portion 4131, the second connecting pipe cooperation portion 4132, and the third connecting pipe cooperation portion 4133 are fixed by welding, and a thickness of the connecting block 411 is greater than a thickness of the connecting plate 412. The first connecting pipe cooperation portion 4131 is provided with the fourth connecting port 54, the second connecting pipe cooperation portion 4132 is provided with the seventh connecting port 57 and the eighth connecting port 58, and the third connecting pipe cooperation portion 4133 is provided with the fifth connecting port 55 and the sixth connecting port 56. The three connecting pipe cooperation portions of the connecting member are further provided with fixing holes 409, which are configured to cooperate with the fixing member 450 for fixing or position-limiting. The connecting plate 412 is located between the connecting block 411 and the three connecting pipe cooperation portions, the connecting block 411 is relatively close to the second heat exchange portion 30, or in other words, the connecting block 411 abuts against the second heat exchange portion 30 and is fixed thereto by welding. The connecting block 411 has three through holes: a through hole 4111, a through hole 4112, and a through hole 4113. The through hole 4111 and the through hole 4112 are non-circular and may be arranged obliquely or in an arc shape. The shape of the two through holes is not fixed, as long as two ends of each of the through hole 4111 and the through hole 4112 can communicate with the corresponding flow passages. The through hole 4113 is circular. Two ends of the through hole 4111 and the through hole 4112, and the through hole 4113 are located on a side, relatively close to a length direction, of the connecting block 411. The connecting plate 412 has five through holes: 4121, 4122, 4123, 4124 and 4125, where the through hole 4121 and the through hole 4125 correspond to the through hole 4111 in position, that is, the through hole 4121 and the through hole 4125 are in communication with the through hole 4111; the through hole 4122 and the through hole 4124 correspond to the through hole 4112 in position, that is, the through hole 4122 and the through hole 4124 are in communication with the through hole 4112; and the through hole 4123 corresponds to the through hole 4113 in position; the fourth connecting port 54 corresponds to the through hole 4121 in position, and the fourth connecting port 54 is in communication with the through hole 4121, that is, in communication with the through hole 4111 of the connecting block 411; the eighth connecting port 58 corresponds to the through hole 4125 in position, and the eighth connecting port 58 is in communication with the through hole 4125, that is, in communication with the through hole 4111 of the connecting block 411; the seventh connecting port 57 corresponds to the through hole 4124 in position, and the seventh connecting port 57 is in communication with the through hole 4124, that is, in communication with the through hole 4112 of the of the connecting block 411; the fifth connecting port 55 corresponds to the through hole 4122 in position, and the fifth connecting port 55 is in communication with the through hole 4122, that is, in communication with the through hole 4112 of the of the connecting block 411; and the sixth connecting port 56 corresponds to the through hole 4123 in position, and the sixth connecting port 56 is in communication with the through hole 4123, that is, in communication with the through hole 4113 of the connecting block 411. In this embodiment, the connecting member may be processed from a profile or a stamping member and be formed by assembly of parts, which can reduce the machining steps.

The throttling heat exchange assembly can facilitate the mounting and connection of the thermal management system, reduce the number of connected pipes and connecting ports, and reduce the volume of the system. The throttling heat exchange assembly used in the vehicle thermal management system is taken as an example for description. It should be noted that, these components are fixed during actual use. For the sake of clarity, the flow of the refrigerant is shown in the exploded view, which is only for clarity and description. Reference is made to FIG. 14 and other views. A vehicle thermal management system is taken as an example for description, where the vehicle thermal management system includes a refrigerant system and a battery thermal management system. The battery thermal management system includes the first connecting port portion 101 and the second connecting port portion 102 of the throttling heat exchange assembly, and the flow passage, in communication with the first connecting port 51 and the second connecting port 52, of the first heat exchange portion 10. The heat of the battery can be transferred to the coolant. The coolant flows through the flow passage of the first heat exchange portion 10 from the first connecting port 51 or the second connecting port 52, and exchanges heat in the first heat exchange portion 10 with a refrigerant in another flow passage, so that the coolant is cooled and then flows back to cool the battery. The third connecting port 53, the fourth connecting port 54, the fifth connecting port 55, the sixth connecting port 56, the seventh connecting port 57, and the eighth connecting port 58 are respectively in communication with the refrigerant system. For example, the refrigerant cooled by a condenser enters the throttling heat exchange assembly from the third connecting port 53, or the refrigerant flowing through a liquid reservoir enters the throttling heat exchange assembly from the third connecting port 53, so that the high-temperature and high-pressure refrigerant enters the third hole passage 301 of the second heat exchange portion 30 through the guiding hole 202, and then flows into the fourth hole passage 302 after exchanging heat in the second heat exchange portion 30 with the refrigerant in another flow passage, and the refrigerant flowing into the fourth hole passage 302 is divided into two parts: one part flows through a flow passage, such as the through hole 4112 of the connecting block 411 and the through hole 4124 of the connecting plate, formed by the connecting member and the second heat exchange portion 30 and flows into the seventh connecting port 57, and flows through the through hole 4112 of the connecting block 411 and the through hole 4122 of the connecting plate and flows into the fifth connecting port 55, and then flows out from the fifth connecting port 55 and the seventh connecting port 57, for example, this part flows to a front evaporator from the fifth connecting port 55 and flows to a rear evaporator from the seventh connecting port 57, or flows to a rear evaporator from the fifth connecting port 55 and flows to a front evaporator from the seventh connecting port 57, where the throttling element 110 may be arranged before the front evaporator or the rear evaporator; the other part of refrigerant enters the throttling element 110 through the through hole 224 of the bridge 20 and the communication port 105 of the pipe in communication with the throttling element 110, where the bridge 20 is not in communication with the second hole passage 104, where the refrigerant enters the second hole passage 104 of the first heat exchange portion 10 after being throttled by the throttling element 110, and exchanges heat in the refrigerant flow passage of the first heat exchange portion 10 with the coolant in the coolant flow passage, then reaches the first hole passage 103, then reaches the first hole passage 303 of the second heat exchange portion 30 through the through hole 223 of the bridge 20, and then flows out from the through hole 411 which is in communication with the first hole passage 303, the through hole 4121 of the connecting plate, and the fourth connecting port 54, and then, for example, flows into to a compressor. In addition, the sixth connecting port 56 may be configured to introduce the refrigerant flowing back from the front evaporator and/or the rear evaporator, this low-temperature refrigerant flows into the second hole passage 304 of the second heat exchange portion through the through hole 4123 of the connecting plate and the through hole 4113 of the connecting block, then flows into the first hole passage 303, and exchanges heat with the high-temperature refrigerant flowing from the third hole passage 301 into the fourth hole passage 302, and the two refrigerants converge in the first hole passage 303 and flow back to the compressor through the fourth connecting port. The eighth connecting port 58 may be configured to introduce the refrigerant flowing back from the front evaporator and/or the rear evaporator, this low-temperature refrigerant flows through the through hole 4125 of the connecting plate and the through hole 4111 of the connecting block, then converges with other refrigerant and flows back to the compressor through the fourth connecting port. The flow direction herein is only for illustration and should not be construed as restriction or closed requirement, and other components can be added in it, such as adding other control valves before the compressor. The bridge 20 is provided with a first mounting portion 207 for mounting a sensing element 250, such as a temperature sensing element. A hole of the first mounting portion 207 is in communication with the through hole 223, so that a sensing head 2501 for sensing temperature is directed through the mounting portion and located in the flow passage where the through hole 223 is located, so that a temperature of the refrigerant flowing through the first heat exchange portion 10 or an outlet temperature of the evaporator can be obtained.

Figure 20:
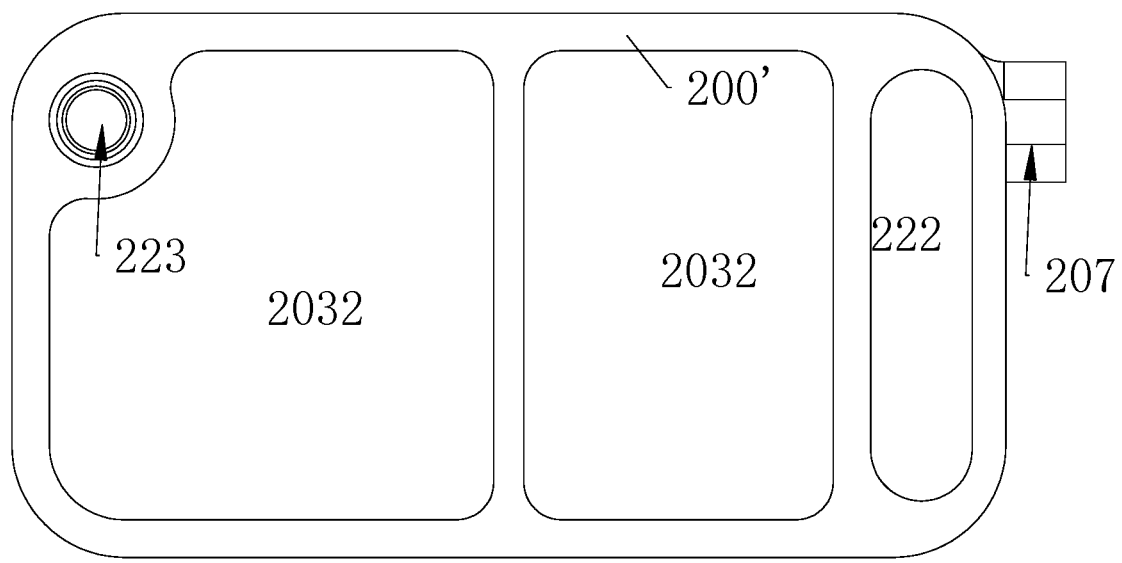
FIG. 20 is a schematic view of the bridge of the throttling heat exchange assembly shown in FIG. 18 and FIG. 19.
Figure 21:
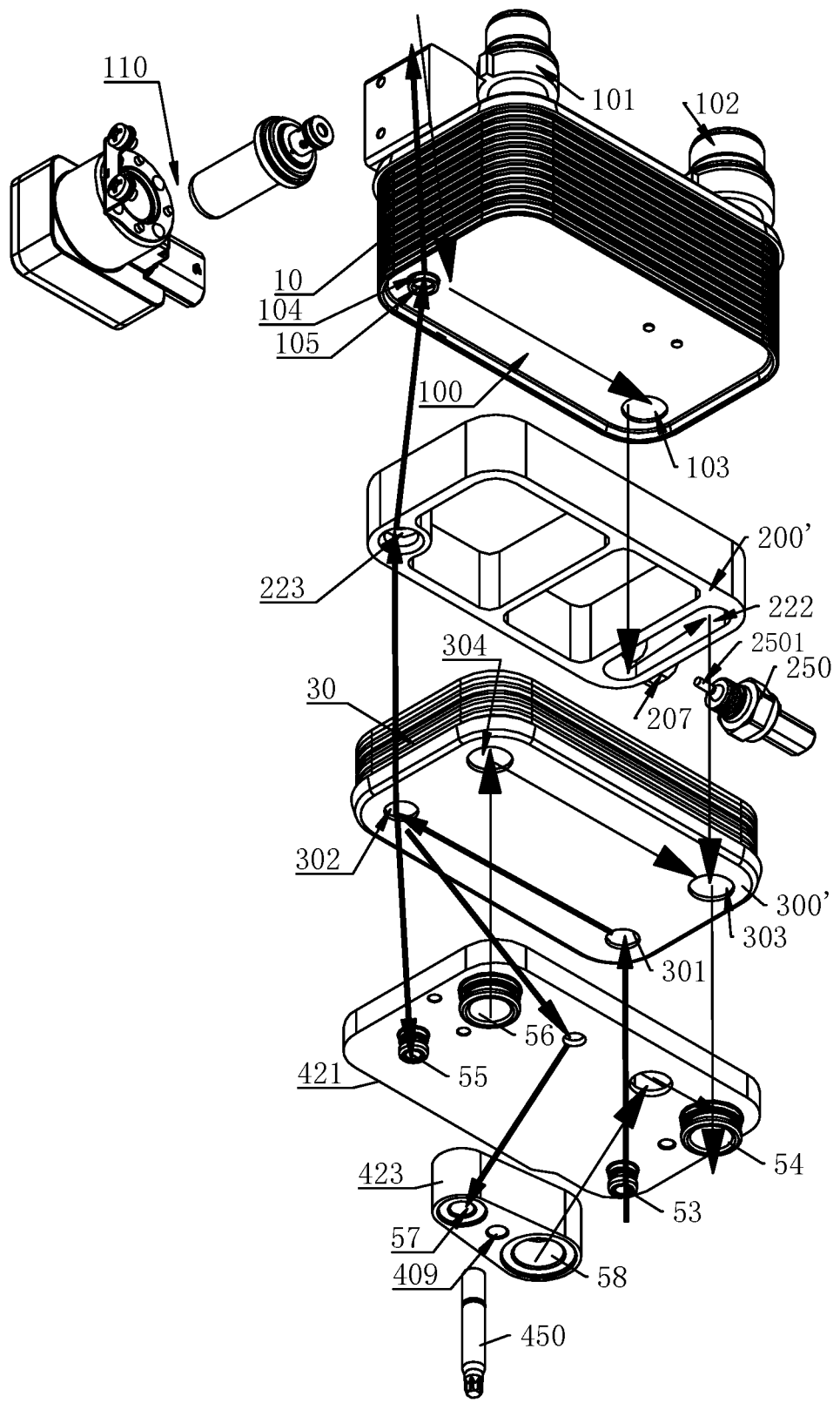
FIG. 21 is a schematic exploded view of the throttling heat exchange assembly shown in FIG. 18 and FIG. 19.
Figure 22:
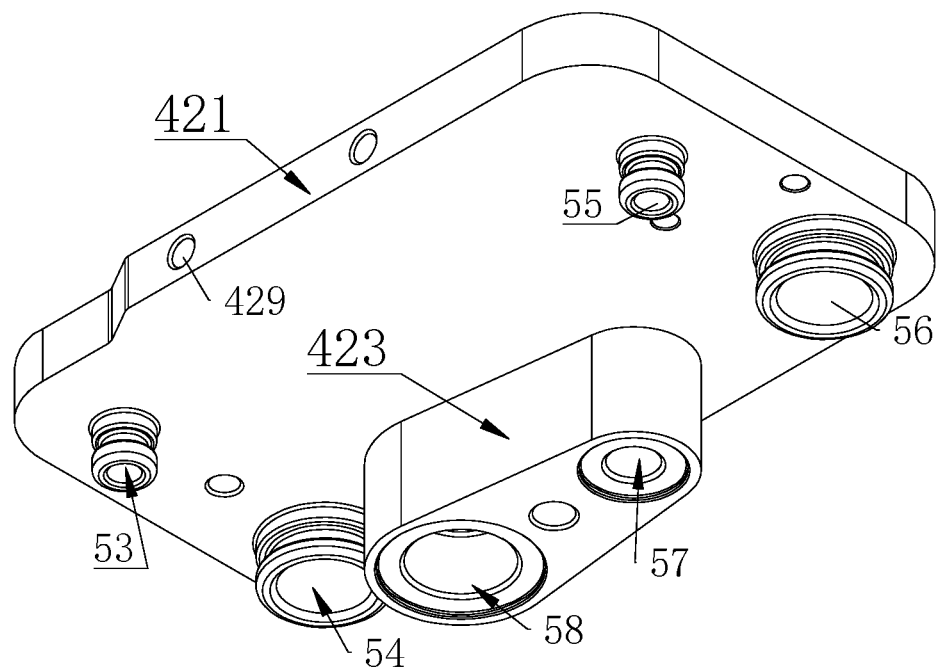
FIG. 22 is a schematic perspective view of the connecting member of the throttling heat exchange assembly shown in FIG. 18 and FIG. 19.
Figure 23:
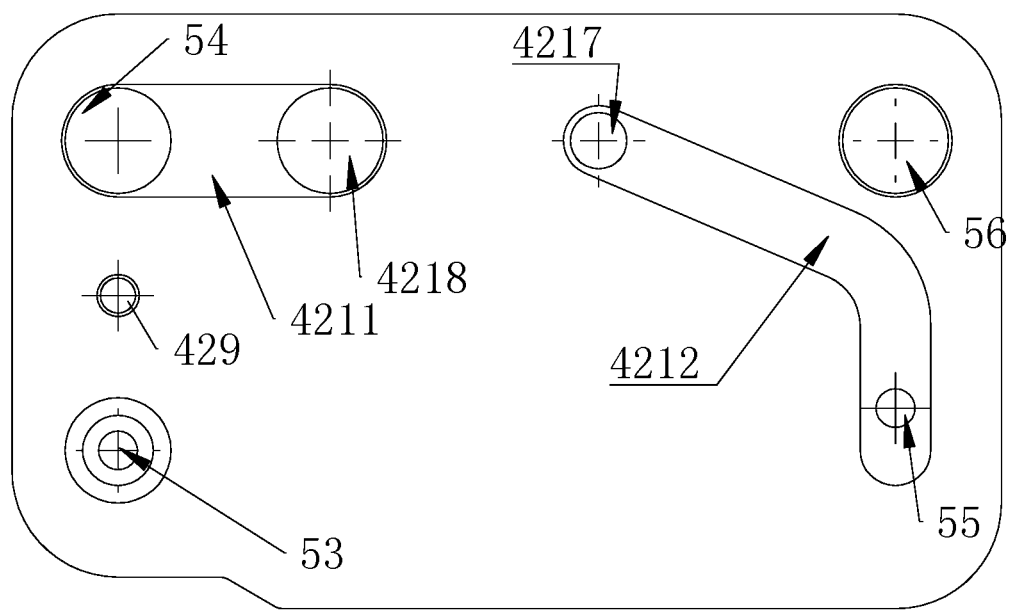
FIG. 23 and FIG. 24 respectively are a front view and a rear view of a connecting block of the connecting member shown in FIG. 22.
Figure 24:
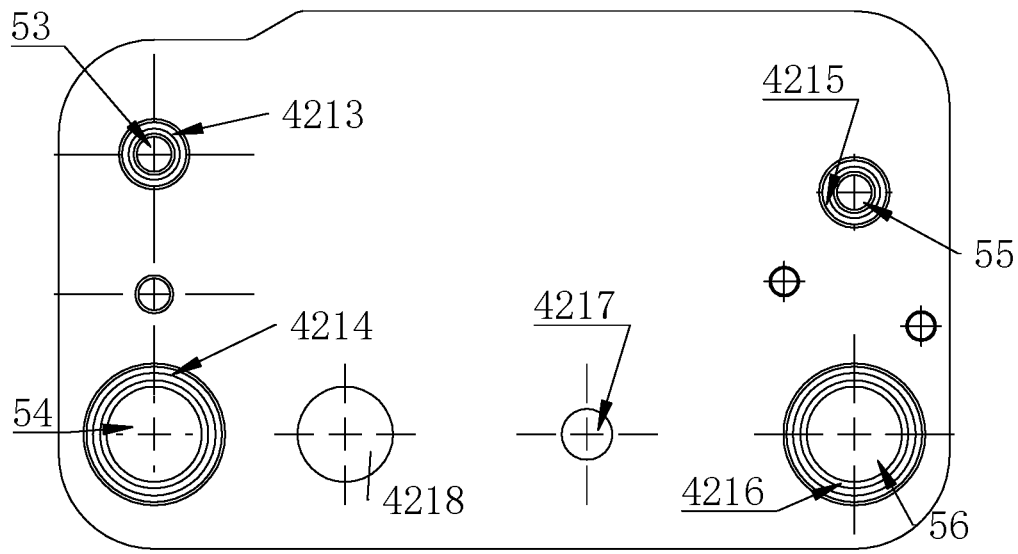

A third embodiment of the throttling heat exchange assembly is described below. Referring to FIGS. 18 to 24, FIG. 18 and FIG. 19 are schematic perspective views of the throttling heat exchange assembly viewed from two perspectives; FIG. 20 is a schematic view of the bridge of the throttling heat exchange assembly; FIG. 21 is a schematic exploded view of the throttling heat exchange assembly;

FIG. 22 is a schematic perspective view of the connecting member of the throttling heat exchange assembly; and FIG. 23 and FIG. 24 respectively are a front view and a rear view of the connecting block of the connecting member shown in FIG. 22.

The throttling heat exchange assembly includes a first heat exchange portion 10, a bridge 20, a second heat exchange portion 30, and a connecting member. The throttling heat exchange assembly has a first connecting port 51, a second connecting port 52, a third connecting port 53, a fourth connecting port 54, a fifth connecting port 55, a sixth connecting port 56, a seventh connecting port 57, and an eighth connecting port 58. The throttling element 110 is fixed or position-limited to the first heat exchange portion 10, where the first heat exchange portion 10 has four hole passages, such as a first hole passage 103 and a second hole passage 104 (two other hole passages are not shown in the figure). The first heat exchange portion 10 includes a first connecting port portion 101 and a second connecting port portion 102, the first connecting port portion 101 has the first connecting port 51 which is configured to communicate with the coolant, the second connecting port portion 102 has the second connecting port 52 which is configured to communicate with the coolant, and the first connecting port 51 is in communication with the second connecting port 52 through a flow passage of the heat exchange core, where the first connecting port portion 101 and the second connecting port portion 102 may be a part of a side plate of the first heat exchange portion 10, or may be separately processed and fixed to a side plate of the first heat exchange portion 10 and/or the heat exchange core by welding.

The bridge 20 has a first cooperation portion 200 and a second cooperation portion 200'. Correspondingly, the first cooperation portion 200 and the cooperation portion 100 of the first heat exchange portion 10 face and cooperate with each other, and the second cooperation portion 200' and the cooperation portion 300 of the second heat exchange portion 30 face and cooperate with each other. The cooperation portion 100 of the first heat exchange portion 10, the cooperation portion 300 of the second heat exchange portion 30, and the two cooperation portions of the bridge each include a flat surface portion. The bridge 20 includes a through hole 223 and a through hole 222, where the through hole 222 extends substantially laterally. The bridge 20 further includes a first mounting portion 207, and a hole of the first cooperation portion 207 is in communication with the through hole 222, or in other words, the mounting portion is arranged on a side close to the through hole 222. Openings, facing the first heat exchange portion 10, of the through hole 222 and the through hole 223 are located inside the first cooperation portion 200 and are surrounded by the first cooperation portion 200, or in other words, the flat surface portions for welding and sealing are provided around the openings of the through hole 223 and the through hole 222. On the other side, openings of the through hole 223 and the through hole 222 are located inside the second cooperation portion 200' and are surrounded by the second cooperation portion 200', or in other words, the flat surface portions for welding and sealing are provided around the openings of the through hole 223 and the through hole 222. Thus, after the cooperation portion 100 of the first heat exchange portion 10 and the first cooperation portion 200 of the bridge are welded and sealed, the openings of the two through holes of the bridge 20 are in communication with corresponding openings for communication of the first heat exchange portion 10. Specifically, the through hole 223 of the bridge 20 is correspondingly in communication with a communication port 105, the communication port 105 is in communication with the throttling element 110, and the through hole 222 is correspondingly in communication with the first hole passage 103 of the first heat exchange portion 10. The openings of the two through holes of the bridge 20 are in communication with corresponding openings for communication of the second heat exchange portion 30. The through hole 223 of the bridge 20 is correspondingly in communication with the fourth hole passage 302 of the second heat exchange portion 30, and the through hole 222 is correspondingly in communication with the first hole passage 303 of the second heat exchange portion 30.

The bridge 20 further includes two through holes 2032, the provision of the through holes 2032 can reduce the weight of the bridge, reduce areas of the flat surface portions of the two cooperation portions of the bridge 20, and reduce the cooperation portions of the bridge 20 with the first heat exchange portion 10 and the second heat exchange portion 30, which can relatively control the range of contact welding, and correspondingly improve the welding quality. In this embodiment, the manufacture of the bridge 20 is relatively simple, such as by using a profile with four corresponding through holes. The bridge may be manufactured by blanking, and processing the mounting portion and two cooperation portion on two sides, so the processing steps may be relatively reduced.

The connecting member includes a connecting block 421 and a connecting port cooperation member 423, where the connecting block 421 and the connecting port cooperation member 423 may be fixed by welding, or may be sealingly connected by a fixing member and a sealing member. The connecting member is provided with the third connecting port 53, the fourth connecting port 54, the fifth connecting port 55, the sixth connecting port 56, the seventh connecting port 57, and the eighth connecting port 58. The connecting block includes a third connecting port portion 4213, a fourth connecting port portion 4214, a fifth connecting port portion 4215, and a sixth connecting port portion 4216. The third connecting port portion 4213, the fourth connecting port portion 4214, the fifth connecting port portion 4215, and the sixth connecting port portion 4216 may have structures that are integral with a plate body of the connecting block, or may have structures that are processed separately and fixed to the plate body of the connecting block by welding. The connecting block is further provided with a through hole 4217, a through hole 4218, and a fixing hole 429 for fixing or position-limiting. The connecting member has a groove 4211 and a groove 4212 on a side facing the second heat exchange portion 30, and the grooves have a blind-hole-like structure. The connecting block is respectively provided with the fourth connecting port 54 and the through hole 4218 on opposite two sides of the groove 4211, where the fourth connecting port 54 and the through hole 4218 are in communication with the groove 4211. The connecting block is provided with the fifth connecting port 55 and the through hole 4217 in the groove 4212, where the fifth connecting port 55 and the through hole 4217 are in communication with the groove 4212. The sixth connecting port 56 is in communication with the second hole passage 304 of the second heat exchange portion 30, the fifth connecting port 55 is in communication with the fourth hole passage 302 of the second heat exchange portion 30, the third connecting port 53 is in communication with the third hole passage 301 of the second heat exchange portion 30, and the fourth connecting port 54 is in communication with the first hole passage 303 of the second heat exchange portion 30. The connecting port cooperation member 423 is provided with the seventh connecting port 57 and the eighth connecting port 58, where the seventh connecting port 57 is correspondingly in communication with the through hole 4217 of the connecting block, and the eighth connecting port 58 is correspondingly in communication with the through hole 4218 of the connecting block.

The flow mode of refrigerant in use is shown in the exploded view of FIG. 21, which is only for illustration, and the components therein are fixed in actual use. In a specific vehicle thermal management system, the vehicle thermal management system includes a refrigerant system and a battery thermal management system. Referring to FIG. 21 and other views, the battery thermal management system includes the first connecting port portion 101 and the second connecting port portion 102 of the throttling heat exchange assembly, and the flow passage, in communication with the first connecting port and the second connecting port, of the first heat exchange portion 10. The heat of the battery can be transferred to the coolant. The coolant flows through the flow passage of the first heat exchange portion from the first connecting port 51 or the second connecting port 52, and exchanges heat in the first heat exchange portion 10 with a refrigerant in another flow passage, so that the coolant is cooled and then flows back to cool the battery. The third connecting port 53, the fourth connecting port 54, the fifth connecting port 55, the sixth connecting port 56, the seventh connecting port 57, and the eighth connecting port 58 are respectively in communication with the refrigerant system. For example, the refrigerant cooled by a condenser enters the throttling heat exchange assembly from the third connecting port 53, or the refrigerant flowing through a liquid reservoir enters the throttling heat exchange assembly from the third connecting port 53, so that the high-temperature and high-pressure refrigerant enters the third hole passage 301 of the second heat exchange portion 30, and then flows into the fourth hole passage 302 after exchanging heat in the second heat exchange portion 30 with the refrigerant in another flow passage, and the refrigerant flowing into the fourth hole passage 302 is divided into two parts: one part flows through a flow passage formed by the connecting member and the second heat exchange portion 30 and also formed by a space where the groove 4212 is located, and flows out from the fifth connecting port 55 and the seventh connecting port 57, for example, this part flows to a front evaporator from the fifth connecting port 55 and flows to a rear evaporator from the seventh connecting port 57, or flows to a rear evaporator from the fifth connecting port 55 and flows to a front evaporator from the seventh connecting port 57, where the throttling element may be arranged before the front evaporator or the rear evaporator; the other part of the refrigerant flows through the hole 223, in communication with the fourth hole passage 302 of the second heat exchange portion 30, of the bridge 20, flows into the throttling element 110 through the communication port 105 which is in communication with the throttling element 110, and then flows into the second hole passage 104 of the first heat exchange portion 10 after being throttled by the throttling element 110, and then exchanges heat in the refrigerant flow passage of the first heat exchange portion 10 with the coolant in the coolant flow passage, then reaches the first hole passage 103, then reaches the first hole passage 303 of the second heat exchange portion 30 through a flow passage formed by the bridge 20, the first heat exchange portion 10 and the second heat exchange portion 30 and also formed by the through hole 222, and then flows out from the fourth connecting port 54 which is in communication with the first hole passage 303, and then, for example, flows into to a compressor. In addition, the sixth connecting port 56 may be configured to introduce the refrigerant flowing back from the front evaporator or the rear evaporator, this low-temperature refrigerant flows into the first hole passage 303 through the second hole passage 304 of the second heat exchange portion, and exchanges heat with the high-temperature refrigerant flowing from the third hole passage 301 into the fourth hole passage 302, and the two refrigerants converge in the first hole passage 303 and flow back to the compressor through the fourth connecting port. In addition, the eighth connecting port 58 may be configured to introduce the refrigerant flowing back from the rear evaporator and/or the front evaporator, this low-temperature refrigerant flows through the flow passage formed by the connecting member and the second heat exchange portion 30 and also formed by the groove 4211, then flows to the fourth connecting port 54, and then the three refrigerants converge and flow back to the compressor through the fourth connecting port 54. The flow direction herein is only for illustration and should not be construed as restriction or closed requirement, and other components can be added in it, such as adding other control valves before the compressor. The bridge 20 is further provided with a first mounting portion 207 for mounting a sensing element 250, such as a temperature sensing element. A sensing head 2501 for sensing temperature is directed through the mounting portion and located in the flow passage where the through hole 222 is located, so that a temperature of the refrigerant flowing through the first heat exchange portion or an outlet temperature of the evaporator can be obtained.

In this embodiment, several refrigerant connecting ports are defined on the connecting member, so that the connection is more convenient in application, and the pipelines are also intensively arranged on the same side.

Figure 25:
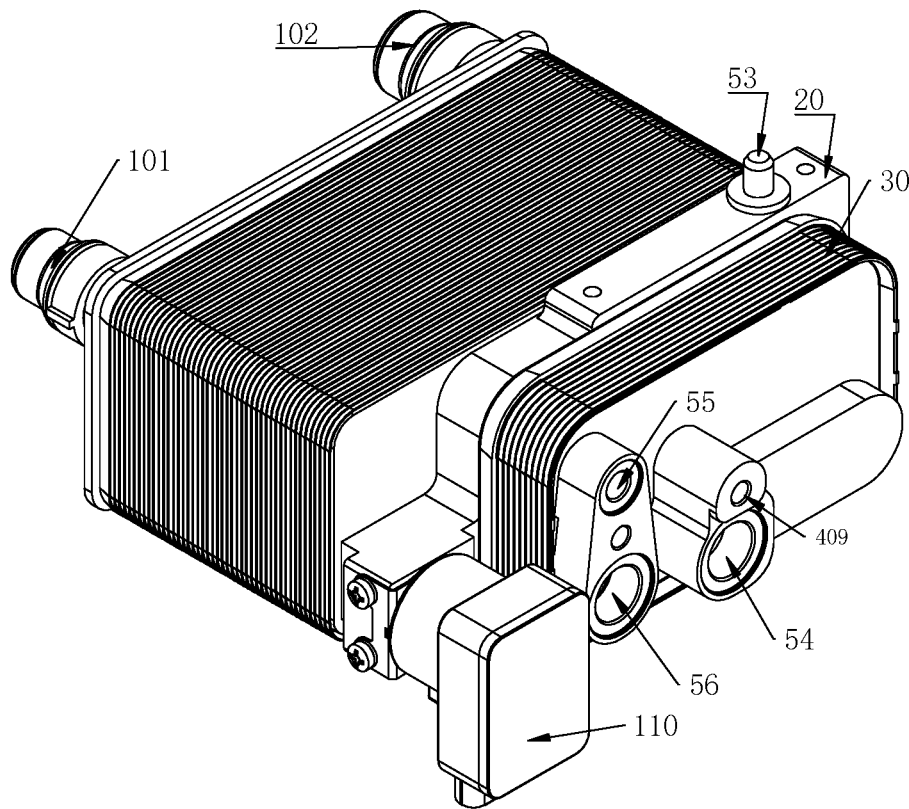
FIG. 25 is a schematic perspective view of a fourth embodiment of the throttling heat exchange assembly.
Figure 26:
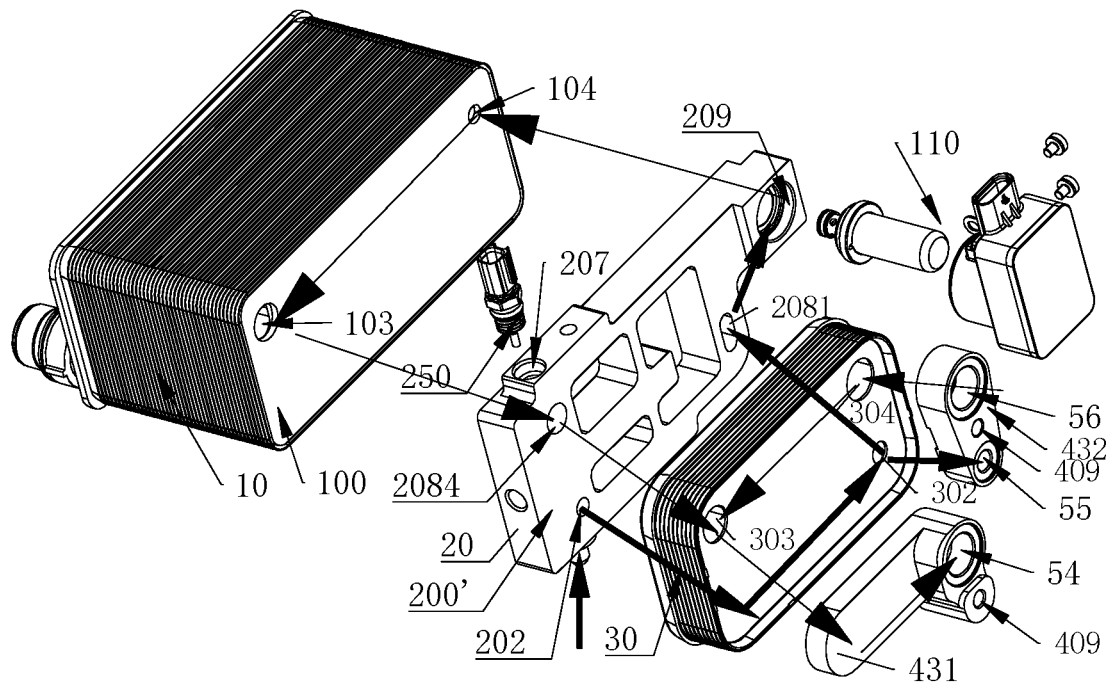
FIG. 26 is a schematic exploded view of the throttling heat exchange assembly shown in FIG. 25.
Figure 27:
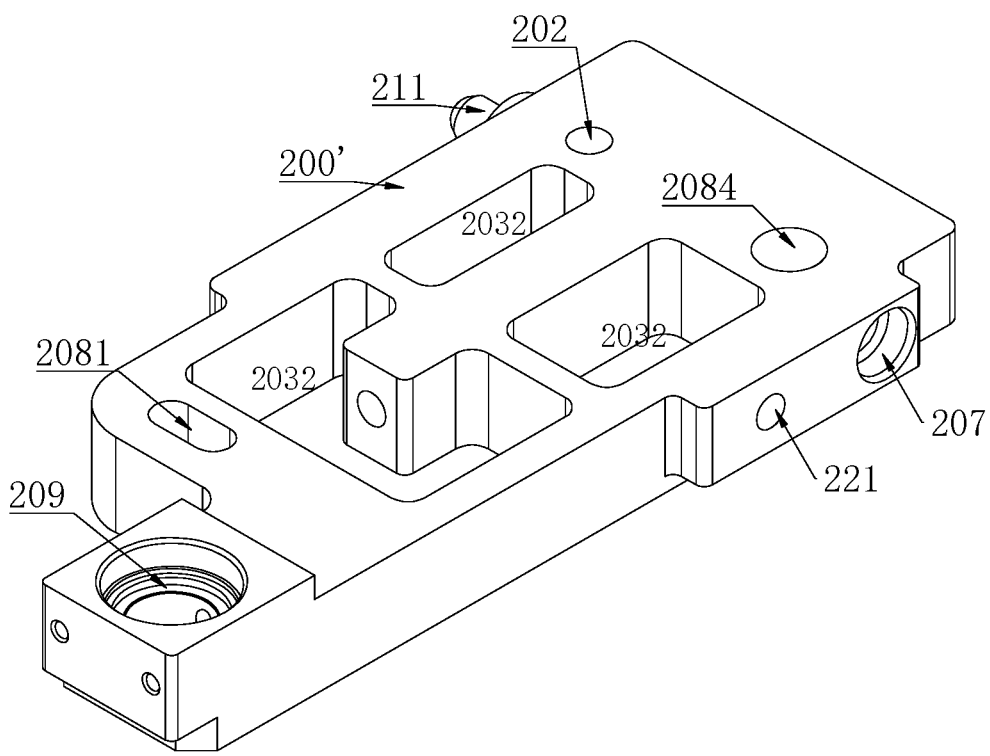
FIG. 27 is a schematic perspective view of the bridge of the throttling heat exchange assembly shown in FIG. 25.
Figure 28:
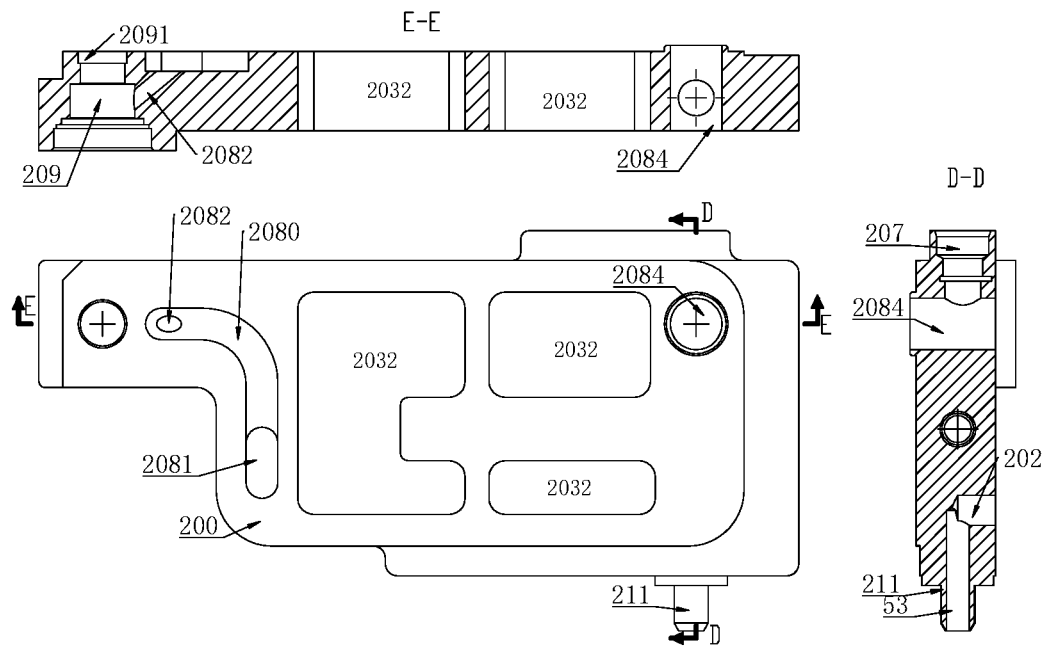
FIG. 28 shows a schematic front view of the bridge shown in FIG. 27, and also shows schematic cross-sectional views of the bridge shown in FIG. 27 taken along line E-E and line D-D.

The throttling heat exchange assembly may also be embodied as shown in FIGS. 25 to 28. FIG. 25 is a schematic perspective view of a fourth embodiment of the throttling heat exchange assembly; FIG. 26 is a schematic exploded view of the throttling heat exchange assembly; FIG. 27 is a schematic perspective view of the bridge of the throttling heat exchange assembly; FIG. 28 shows a schematic front view of the bridge shown in FIG. 27, and also shows schematic cross-sectional views of the bridge shown in FIG. 27 taken along line E-E and line D-D.

The throttling heat exchange assembly includes a first heat exchange portion 10, a throttling element 110, a bridge 20, a second heat exchange portion 30, and a connecting member. Most of the bridge 20 is located between the first heat exchange portion 10 and the second heat exchange portion 30, and the connecting member 40 is located on another side of the second heat exchange portion 30, that is, the bridge 20 and the connecting member 40 are respectively arranged on two sides of the second heat exchange portion. The first heat exchange portion 10, the bridge 20, and the second heat exchange portion 30 are fixed by welding, or the first heat exchange portion 10, the bridge 20, the second heat exchange portion 30 and the connecting member are fixed by welding. The first heat exchange portion 10 is larger than the second heat exchange portion 30.

The first heat exchange portion 10 has a heat exchange core, the first heat exchange portion 10 has two flow passages through which fluids flow for heat exchange, and the two fluid flow passages are separated from each other. The first heat exchange portion 10 includes interlayer flow passages separated by stacked plates, and at least two kinds of fluids can flow through the first heat exchange portion 10. These two fluids can exchange heat in the first heat exchange portion 10, for example, one fluid is a refrigerant, and the other fluid may be a coolant for cooling heating elements such as a battery. In addition, the first heat exchange portion may also be used for three fluids. For example, one fluid is a refrigerant, and the other two fluids may be coolants. The two coolants may be controlled to selectively exchange heat with the refrigerant, and then the coolants can be used to cool the components that need to be cooled after the coolants are cooled by heat exchange. The following is described with two fluids flowing through the first heat exchange portion as an example.

The throttling heat exchange assembly has a first connecting port 51, a second connecting port 52, a third connecting port 53, a fourth connecting port 54, a fifth connecting port 55, and a sixth connecting port 56. The first heat exchange portion 10 is provided with the first connecting port 101 and the second connecting port 102, the bridge 20 is provided with the third connecting port 211, and the connecting member 40 is provided with the fourth connecting port 54, the fifth connecting port 55, and the sixth connecting port 56. The throttling element 110 is fixed or position-limited to the bridge 20, where the first heat exchange portion 10 has four hole passages, such as a first hole passage 103 and a second hole passage 104 (two other hole passages are not shown in the figure). The first heat exchange portion 10 includes a first connecting port portion 101 and a second connecting port portion 102, the first connecting port portion 101 has the first connecting port 51 which is configured to communicate with the coolant, the second connecting port portion 102 has the second connecting port 52 which is configured to communicate with the coolant, and the first connecting port 51 is in communication with the second connecting port 52 through a flow passage of the heat exchange core, where the first connecting port portion 101 and the second connecting port portion 102 may be a part of a side plate of the first heat exchange portion 10, or may be separately processed and fixed to a side plate of the first heat exchange portion 10 and/or the heat exchange core by welding.

The bridge 20 has a first cooperation portion 200 and a second cooperation portion 200'. Correspondingly, the first heat exchange portion 10 has a cooperation portion 100. The cooperation portion 100 of the first heat exchange portion 10 correspondingly cooperates with the first cooperation portion 200 of the bridge 20. The second heat exchange portion 30 has a cooperation portion 300, and the cooperation portion 300 correspondingly cooperates with the second cooperation portion 200' of the bridge 20. The cooperation portion 100 of the first heat exchange portion 10, the cooperation portion 300 of the second heat exchange portion 30 and the two cooperation portions of the bridge each include a flat surface portion. An opening of a hole, a groove or a conducting portion for communication, arranged on a side, where the first cooperation portion 200 is located, of the bridge 20 is located inside the first cooperation portion 200, and each opening for communication is surrounded by the first cooperation portion 200, and the first heat exchange portion 10 has a respective opening for communication corresponding to each opening for communication of the bridge 20 in position, and each opening for communication of the first heat exchange portion 10 is located in the cooperation portion 100 thereof and each opening for communication thereof is surrounded by the cooperation portion 100. Thus, after the cooperation portion 100 of the first heat exchange portion 10 and the first cooperation portion 200 of the bridge 20 are welded and sealed, each opening for communication of the bridge 20 is in communication with the corresponding opening for communication of the first heat exchange portion 10, or in other words, each of the first heat exchange portion 10 and the bridge 20 includes a part of the corresponding cooperation portion thereof around each opening for communication thereof, and the two form a substantially closed structure at the cooperation portions which are arranged oppositely. The first heat exchange portion 10 has an opening of the first hole passage 103 and an opening of the second hole passage 104 on a side facing the bridge 20, and the bridge 20 has corresponding holes 2084 and 2091 on a side facing the first heat exchange portion 10, where an opening of the hole 2084 corresponds to the opening of the first hole passage 103 of the first heat exchange portion 10 in position, and an opening of the hole 2091 corresponds to the opening of the second hole passage 104 of the first heat exchange portion in position. In addition, the bridge 20 also has a groove 2080 on the side facing the first heat exchange portion 10, where one side of the groove 2080 is in communication with a hole 2081, an inclined hole 2082 is defined on another side of the groove 2080, and another end of the inclined hole 2082 is in communication with a hole of a mounting portion 209, so that the hole of the mounting portion 209 is in communication with the hole 2081 through the inclined hole 2082 and the groove 2080.

The cooperation portion 300 of the second heat exchange portion 30 corresponds to the second cooperation portion 200' of the bridge 20 in position. Each opening for communication on a side, facing the second heat exchange portion 30, of the bridge 20 is in communication with a corresponding opening for communication of the second heat exchange portion 30 after the second cooperation portion 200' of the bridge 20 and the cooperation portion 300 of the second heat exchange portion 30 are welded and sealed. Specifically, the second heat exchange portion 30 has openings of three hole passages on a side facing the bridge 20: openings of a third hole passage 301, a fourth hole passage 302 and a first hole passage 303. The bridge 20 has an opening of a guiding hole 202, an opening of the hole 2081, and an opening of the hole 2084 on the side facing the second heat exchange portion 30, that is, on the second cooperation portion. The opening of the third hole passage 301 of the second heat exchange portion 30 corresponds to the opening of the guiding hole 202 in position, the opening of the fourth hole passage 302 corresponds to the opening of the hole 2081 in position, and the opening of the first hole passage 303 corresponds to the opening of the hole 2084 in position.

The bridge 20 includes a third connecting port portion 211, a first mounting portion 207, and a second mounting portion 209. The third connecting port portion 211 has the third connecting port 53. The third connecting port portion 211 has a structure which protrudes outward. The third connecting port portion 211 may have a structure integrated with a main body of the bridge 20, or may have a structure that is processed separately and fixed to a main body of the bridge 20 by welding. The first mounting portion 207 is configured to cooperatively mount a sensing element, and the second mounting portion 209 is configured to cooperatively mount the throttling element. The hole of the first mounting portion 207 is in communication with the hole 2084. A sensing head 2501 for sensing temperature is directed through the first mounting portion 207 and located in the flow passage where the hole 2084 is located, so that a temperature of the refrigerant flowing through the first heat exchange portion 10 or an outlet temperature of the evaporator can be obtained. In addition, the throttling element may be mounted in other orientation, for example, the mounting portion is arranged to extend from the side of the bridge to an interior of the bridge, and an axis of the throttling element is substantially parallel to the length direction of the bridge.

In addition, the bridge 20 is provided with three through holes 2032, so as to reduce the weight of the bridge and reduce the areas of the flat surface portions to be welded, thereby improving the welding quality. The bridge 20 is further provided with a fixing hole 221 for fixing.

The connecting member includes a first connecting portion 431 and a second connecting portion 432, where the first connecting portion 431 includes the fourth connecting port 4, the second connecting portion 432 includes the fifth connecting port 55 and the sixth connecting port 56, the first connecting portion 431 has a space correspondingly cooperating with the first hole passage 303 of the second heat exchange portion 30 to form a flow path from the first hole passage 303 to the fourth connecting port, which is specifically shown in the figure. In addition, the first connecting portion 431 may also be fixed at a corresponding position around the first hole passage 303 by a joint. The fifth connecting port 55 of the second connecting portion 432 is configured to correspondingly cooperate with the fourth hole passage 302 of the second heat exchange portion 30, and the sixth connecting port 56 of the second connecting portion 432 is configured to correspondingly cooperate with the second hole passage 304 of the second heat exchange portion 30. The connecting member may further include a fixing member 450 for fixing or position-limiting, the first connecting portion 431 and the second connecting portion 432 may have fixing holes, and the fixing member 450 may be fixed or position-limited to the fixing holes 409.

The throttling heat exchange assembly can facilitate the mounting and connection of the thermal management system, reduce the number of connected pipes, and reduce the volume of the system. The throttling heat exchange assembly used in the vehicle thermal management system is taken as an example for description. It should be noted that, these components are fixed during actual use. For the sake of clarity, the flow of the refrigerant is shown in the exploded view, which is only for clarity and description. In a specific vehicle thermal management system, the vehicle thermal management system includes a refrigerant system and a battery thermal management system. Referring to FIG. 26 and other views, the battery thermal management system includes the first connecting port portion 101 and the second connecting port portion 102 of the throttling heat exchange assembly, and the flow passage, in communication with the first connecting port and the second connecting port, of the first heat exchange portion 10. The heat of the battery can be transferred to the coolant. The coolant flows through the flow passage of the first heat exchange portion 10 from the first connecting port 51 or the second connecting port 52, and exchanges heat in the first heat exchange portion 10 with a refrigerant in another flow passage, so that the coolant is cooled and then flows back to cool the battery. The third connecting port 53, the fourth connecting port 54, the fifth connecting port 55, and the sixth connecting port 56 are respectively in communication with the refrigerant system. For example, the refrigerant cooled by a condenser enters the throttling heat exchange assembly from the third connecting port 53, or the refrigerant flowing through a liquid reservoir enters the throttling heat exchange assembly from the third connecting port 53, so that the high-temperature and high-pressure refrigerant enters the third hole passage 301 of the second heat exchange portion 30 through the guiding hole 202, and then flows into the fourth hole passage 302 after exchanging heat in the second heat exchange portion 30 with the refrigerant in another flow passage, and the refrigerant flowing into the fourth hole passage 302 is divided into two parts: one part flows through the second connecting portion 432 and flows out from the fifth connecting port 55, for example, this part flows to a front evaporator or other evaporator from the fifth connecting port 55, and the throttling element may be arranged before the front evaporator; the other part of refrigerant enters the throttling element 110 through the hole 2081, the groove 2080, and the inclined hole 2082 of the bridge, then enters the second hole passage 104 of the first heat exchange portion 10 through the hole 2091 after being throttled by the throttling element 110, and exchanges heat in the refrigerant flow passage of the first heat exchange portion 10 with the coolant in the coolant flow passage, then reaches the first hole passage 103, then flows through the hole 2084 of the bridge and the first hole passage 303 of the second heat exchange portion 30, then flows out from the fourth connecting port which is in communication with the first hole passage 303, and then, for example, flows into to a compressor. In addition, the sixth connecting port 56 may be configured to introduce the refrigerant flowing back from the front evaporator or other evaporator, this low-temperature refrigerant flows into the first hole passage 303 through the second hole passage 304 of the second heat exchange portion 30, and exchanges heat with the high-temperature refrigerant flowing from the third hole passage 301 into the fourth hole passage 302, and the two refrigerants converge in the first hole passage 303 and flow back to the compressor through the fourth connecting port, so that the low-temperature refrigerant is used to cool the high-temperature refrigerant, which can lower the condensing temperature of the refrigerant and prevent the temperature of the refrigerant returning to the compressor from being excessively high. The flow direction herein is only for illustration and should not be construed as restriction or closed requirement, and other components can be added in it, such as adding other control valves before the compressor.

Figure 29:
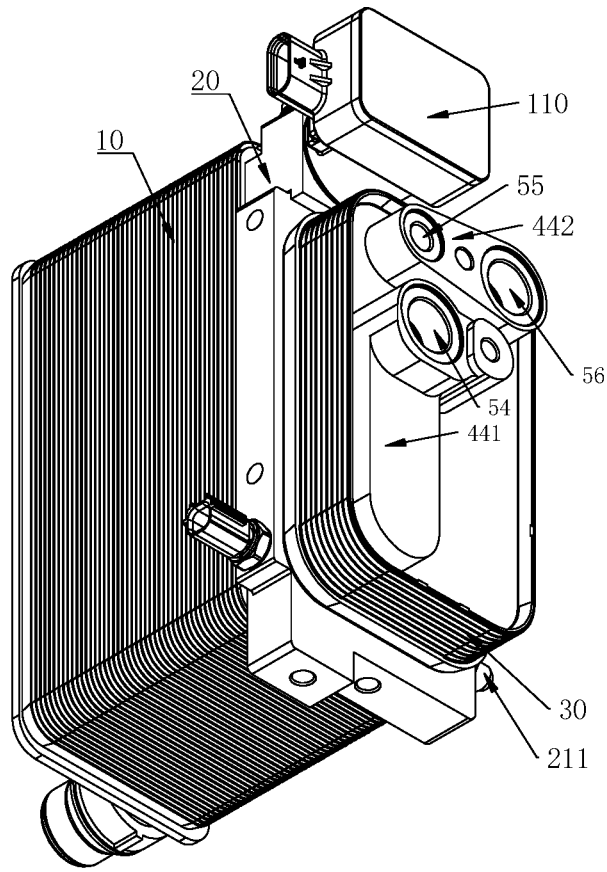
FIG. 29 is a schematic perspective view of a fifth embodiment of the throttling heat exchange assembly.
Figure 30:
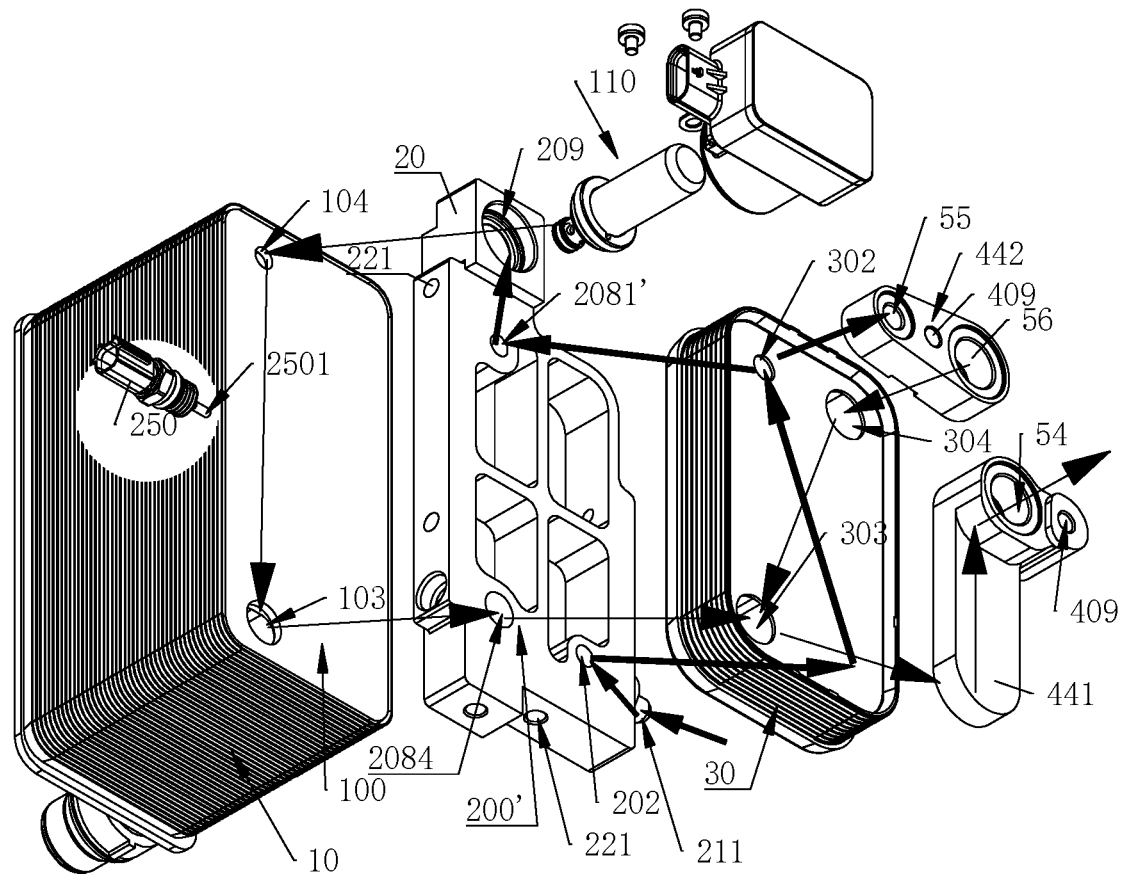
FIG. 30 is a schematic exploded view of the throttling heat exchange assembly shown in FIG. 29.
Figure 31:
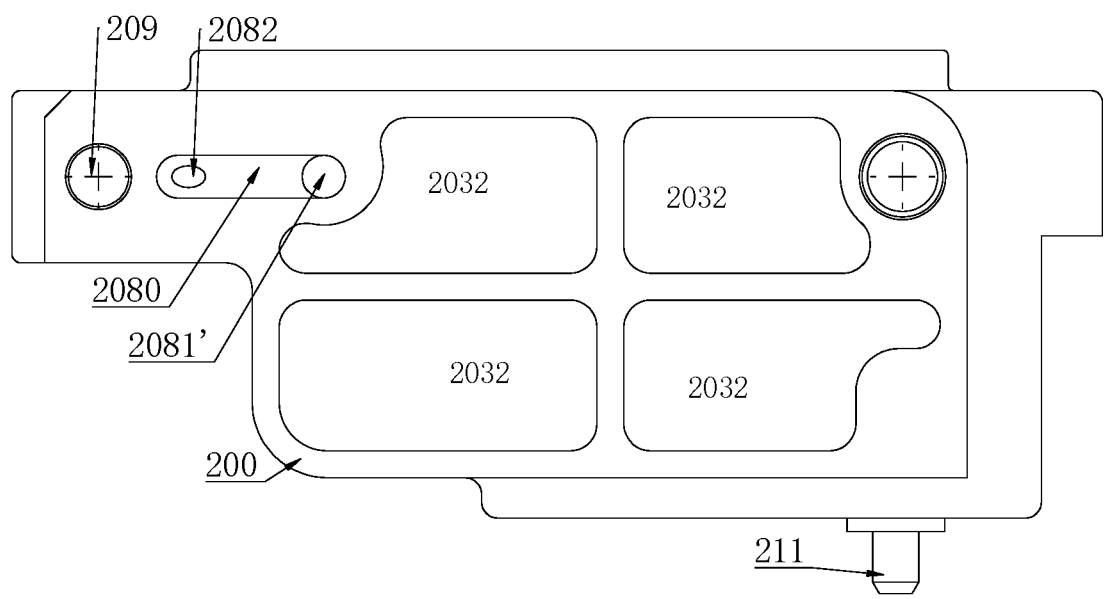
FIG. 31 is a schematic view of the bridge of the throttling heat exchange assembly shown in FIG. 29.
Figure 32:
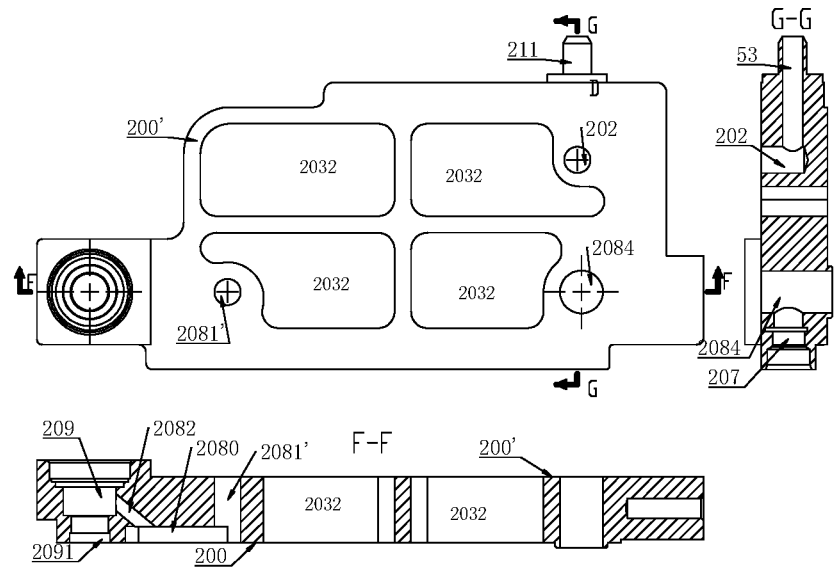
FIG. 32 shows a schematic view of the bridge shown in FIG. 31 viewed from another perspective, and also shows schematic cross-sectional views of the bridge shown in FIG. 31 taken along line G-G and line F-F.

The throttling heat exchange assembly may also be embodied as shown in FIGS. 29 to 32. FIG. 29 is a schematic perspective view of a fifth embodiment of the throttling heat exchange assembly; FIG. 30 is a schematic exploded view of the throttling heat exchange assembly; FIG. 31 is a schematic view of the bridge of the throttling heat exchange assembly; and FIG. 32 shows a schematic view of the bridge shown in FIG. 31 viewed from another perspective, and also shows schematic cross-sectional views of the bridge shown in FIG. 31 taken along line G-G and line F-F. The throttling heat exchange assembly includes a first heat exchange portion 10, a throttling element 110, a bridge 20, a second heat exchange portion 30, and a connecting member. Most of the bridge 20 is located between the first heat exchange portion 10 and the second heat exchange portion 30, and the connecting member is located on another side of the second heat exchange portion 30, that is, the bridge 20 and the connecting member are respectively arranged on two sides of the second heat exchange portion 30. The first heat exchange portion 10, the bridge 20, and the second heat exchange portion 30 are fixed by welding, or the first heat exchange portion 10, the bridge 20, the second heat exchange portion 30 and the connecting member are fixed by welding. The first heat exchange portion 10 is larger than the second heat exchange portion 30.

The first heat exchange portion 10 has a heat exchange core, the first heat exchange portion 10 at least includes two flow passages through which fluids flow for heat exchange, and the two fluid flow passages are separated from each other. The first heat exchange portion 10 includes interlayer flow passages separated by stacked plates, and at least two kinds of fluids can flow through the first heat exchange portion 10. These two fluids can exchange heat in the first heat exchange portion, for example, one fluid is a refrigerant, and the other fluid may be a coolant for cooling heating elements such as a battery or cooling a carriage. In addition, the first heat exchange portion may also be used for three fluids. For example, one fluid is a refrigerant, and the other two fluids may be coolants. The two coolants may be controlled to selectively exchange heat with the refrigerant, and then the coolants can be used to cool the components that need to be cooled after the coolants are cooled by heat exchange. The following is described with two fluids flowing through the first heat exchange portion as an example.

The throttling heat exchange assembly has a first connecting port 51, a second connecting port 52, a third connecting port 53, a fourth connecting port 54, a fifth connecting port 55, and a sixth connecting port 56. The first heat exchange portion 10 is provided with the first connecting port 101 and the second connecting port 102, the bridge 20 is provided with the third connecting port 211, and the connecting member is provided with the fourth connecting port 54, the fifth connecting port 55, and the sixth connecting port 56. The throttling element 110 is fixed or position-limited to the bridge 20, where the first heat exchange portion 10 has four hole passages, such as a first hole passage 103 and a second hole passage 104 (two other hole passages are not shown in the figure). The first heat exchange portion 10 includes a first connecting port portion 101 and a second connecting port portion 102, the first connecting port portion 101 has the first connecting port 51 which is configured to communicate with the coolant, the second connecting port portion 102 has the second connecting port 52 which is configured to communicate with the coolant, and the first connecting port 51 is in communication with the second connecting port 52 through a flow passage of the heat exchange core, where the first connecting port portion 101 and the second connecting port portion 102 may be a part of a side plate of the first heat exchange portion 10, or may be separately processed and fixed to a side plate of the first heat exchange portion 10 and/or the heat exchange core by welding, or the first connecting port portion 101 and the second connecting port portion 102 may be fixed to the first heat exchange portion 10 by pipe joints.

The bridge 20 has a first cooperation portion 200 and a second cooperation portion 200'. Correspondingly, the first heat exchange portion 10 has a cooperation portion 100. The cooperation portion 100 of the first heat exchange portion 10 correspondingly cooperates with the first cooperation portion 200 of the bridge 20. The second heat exchange portion 30 has a cooperation portion 300, and the cooperation portion 300 correspondingly cooperates with the second cooperation portion 200' of the bridge 20. The cooperation portion 100 of the first heat exchange portion 10, the cooperation portion 300 of the second heat exchange portion 30 and the two cooperation portions of the bridge 20 each include a flat surface portion. An opening of a hole, a groove or a conducting portion for communication, arranged on a side, where the first cooperation portion 200 is located, of the bridge 20 is located inside the first cooperation portion 200, and each opening for communication is surrounded by the first cooperation portion 200, and the first heat exchange portion 10 has a respective opening for communication corresponding to each opening for communication of the bridge 20 in position, and each opening for communication of the first heat exchange portion 10 is located in the cooperation portion 100 thereof and each opening for communication thereof is surrounded by the cooperation portion 100. Thus, after the cooperation portion 100 of the first heat exchange portion 10 and the first cooperation portion 200 of the bridge 20 are welded and sealed, each opening for communication of the bridge 20 is in communication with the corresponding opening for communication of the first heat exchange portion 10, or in other words, each of the first heat exchange portion 10 and the bridge 20 includes a part of the corresponding cooperation portion thereof around each opening for communication thereof, and the two form a substantially closed structure at the cooperation portions which are arranged oppositely. The first heat exchange portion 10 has an opening of the first hole passage 103 and an opening of the second hole passage 104 on a side facing the bridge 20, and the bridge 20 has corresponding holes 2084 and 2091 on a side facing the first heat exchange portion 10, where an opening of the hole 2084 corresponds to the opening of the first hole passage 103 of the first heat exchange portion 10 in position, and an opening of the hole 2091 corresponds to the opening of the second hole passage 104 of the first heat exchange portion 10 in position. In addition, the bridge 20 also has a groove 2080 on the side facing the first heat exchange portion 10, where the groove 2080 is in communication with a hole 2081', an inclined hole 2082 is defined on another side of the groove, and another end of the inclined hole 2082 is in communication with a hole of a mounting portion 209, so that the hole of the mounting portion 209 is in communication with the hole 2081' through the inclined hole 2082 and the groove 2080.

The cooperation portion 300 of the second heat exchange portion 30 corresponds to the second cooperation portion 200' of the bridge in position. Each opening for communication on a side, facing the second heat exchange portion 30, of the bridge 20 is in communication with a corresponding opening for communication of the second heat exchange portion 30 after the second cooperation portion 200' of the bridge 20 and the cooperation portion 300 of the second heat exchange portion 30 are welded and sealed. Specifically, the second heat exchange portion 30 has openings of three hole passages on a side facing the bridge 20: openings of a third hole passage 301, a fourth hole passage 302 and a first hole passage 303. The bridge 20 has an opening of a guiding hole 202, an opening of the hole 2081', and an opening of the hole 2084 on the side facing the second heat exchange portion 30. The opening of the third hole passage 301 of the second heat exchange portion 30 corresponds to the opening of the guiding hole 202 in position, the opening of the fourth hole passage 302 corresponds to the opening of the hole 2081' in position, and the opening of the first hole passage 303 corresponds to the opening of the hole 2084 in position.

The bridge 20 includes a third connecting port portion 211, a first mounting portion 207, and a second mounting portion 209. The third connecting port portion 211 has the third connecting port 53. The third connecting port portion 211 has a structure which protrudes outward. The third connecting port portion 211 may have a structure integrated with a main body of the bridge 20, or may have a structure that is processed separately and fixed to a main body of the bridge 20 by welding. The first mounting portion 207 is configured to cooperatively mount a sensing element 250 such as a temperature sensing element, and the second mounting portion 209 is configured to cooperatively mount the throttling element 110. The hole of the first mounting portion 207 is in communication with the hole 2084. A sensing head 2501 for sensing temperature is directed through the first mounting portion 207 and located in the flow passage where the hole 2084 is located, so that a temperature of the refrigerant flowing through the first heat exchange portion 10 or an outlet temperature of the evaporator can be obtained.

In addition, the bridge 20 is provided with four through holes 2032, so as to reduce the weight of the bridge 20 and reduce the areas of the flat surface portions to be welded, thereby improving the welding quality. The bridge 20 is further provided with a fixing hole 221 for fixing.

The connecting member includes a first connecting portion 441 and a second connecting portion 442, where the first connecting portion 441 includes the fourth connecting port 54, the second connecting portion 442 includes the fifth connecting port 55 and the sixth connecting port 56, the first connecting portion 441 has a space correspondingly cooperating with the first hole passage 303 of the second heat exchange portion 30 to form a flow path from the first hole passage 303 to the fourth connecting port. In addition, the first connecting portion 441 may also be fixed at a corresponding position around the first hole passage 303 by a joint. The fifth connecting port 55 of the second connecting portion 442 is configured to correspondingly cooperate with the fourth hole passage 302 of the second heat exchange portion 30, and the sixth connecting port 56 of the second connecting portion 442 is configured to correspondingly cooperate with the second hole passage 304 of the second heat exchange portion 30. The connecting member may further include a fixing member 450 for fixing or position-limiting, the first connecting portion 441 and the second connecting portion 442 may have fixing holes 409, and the fixing member 450 may be fixed or position-limited to the fixing holes 409.

The throttling heat exchange assembly can facilitate the mounting and connection of the thermal management system, reduce the number of connected pipes, and reduce the volume of the system. The throttling heat exchange assembly used in the vehicle thermal management system is taken as an example for description. It should be noted that, these components are fixed during actual use. For the sake of clarity, the flow of the refrigerant is shown in the exploded view, which is only for clarity and description. In a specific vehicle thermal management system, the vehicle thermal management system includes a refrigerant system and a battery thermal management system. Referring to FIG. 30 and other views, the battery thermal management system includes the first connecting port portion 101 and the second connecting port portion 102 of the throttling heat exchange assembly, and the flow passage, in communication with the first connecting port and the second connecting port, of the first heat exchange portion 10. The heat of the battery can be transferred to the coolant. The coolant flows through the flow passage of the first heat exchange portion 10 from the first connecting port 51 or the second connecting port 52, and exchanges heat in the first heat exchange portion 10 with a refrigerant in another flow passage, so that the coolant is cooled and then flows back to cool the battery. The third connecting port 53, the fourth connecting port 54, the fifth connecting port 55, and the sixth connecting port 56 are respectively in communication with the refrigerant system. For example, the refrigerant cooled by a condenser enters the throttling heat exchange assembly through the third connecting port 53 and the bridge 20, or the refrigerant flowing through a liquid reservoir enters the throttling heat exchange assembly from the third connecting port 53, so that the high-temperature and high-pressure refrigerant enters the third hole passage 301 of the second heat exchange portion 30 through the guiding hole 202, and then flows into the fourth hole passage 302 after exchanging heat in the second heat exchange portion 30 with the refrigerant in another flow passage, and the refrigerant flowing into the fourth hole passage 302 is divided into two parts: one part flows through the second connecting portion 432 and flows out from the fifth connecting port 55, for example, this part flows to a front evaporator or other evaporator from the fifth connecting port 55, and the throttling element 110 may be arranged before the front evaporator; the other part of refrigerant enters the throttling element 110 through the hole 2081', the groove 2080, and the inclined hole 2082 of the bridge 20, then enters the second hole passage 104 of the first heat exchange portion 10 through the hole 2091 after being throttled by the throttling element 110, and exchanges heat in the refrigerant flow passage of the first heat exchange portion 10 with the coolant in the coolant flow passage, then reaches the first hole passage 103, then flows through the hole 2084 of the bridge 20 and the first hole passage 303 of the second heat exchange portion 30, then flows out from the fourth connecting port which is in communication with the first hole passage 303, and then, for example, flows into to a compressor. In addition, the sixth connecting port 56 may be configured to introduce the refrigerant flowing back from the front evaporator or other evaporator, this low-temperature refrigerant flows into the first hole passage 303 through the second hole passage 304 of the second heat exchange portion, and exchanges heat with the high-temperature refrigerant flowing from the third hole passage 301 into the fourth hole passage 302, and the two refrigerants converge in the first hole passage 303 and flow back to the compressor through the fourth connecting port, so that the low-temperature refrigerant is used to cool the high-temperature refrigerant, which can lower the condensing temperature of the refrigerant and prevent the temperature of the refrigerant returning to the compressor from being excessively high. The flow direction herein is only for illustration and should not be construed as restriction or closed requirement, and other components can be added in it, such as adding other control valves before the compressor.

Figure 33:
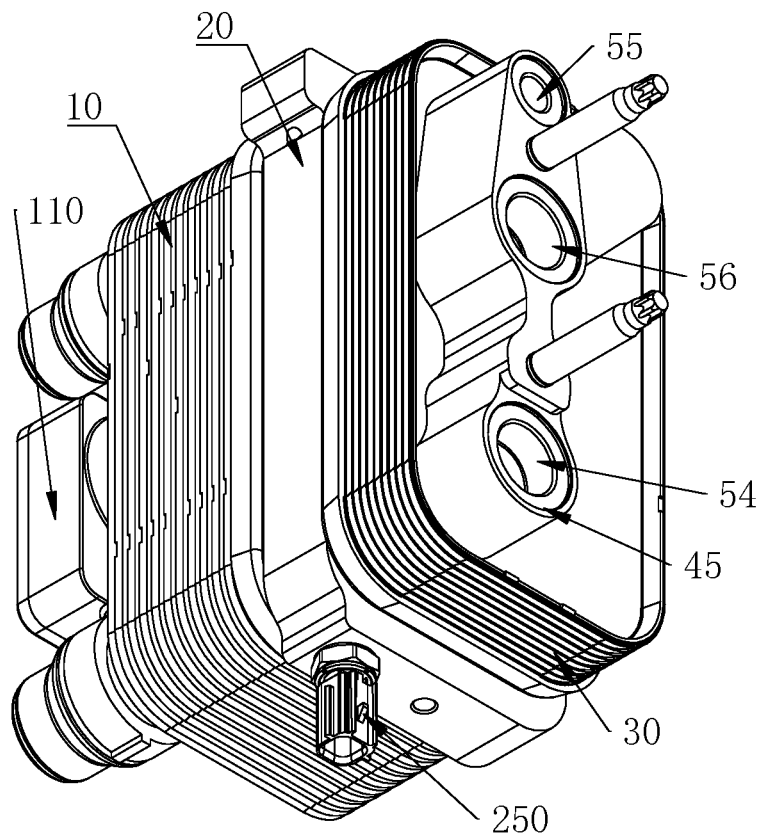
FIG. 33 is a schematic perspective view of a sixth embodiment of the throttling heat exchange assembly.
Figure 34:
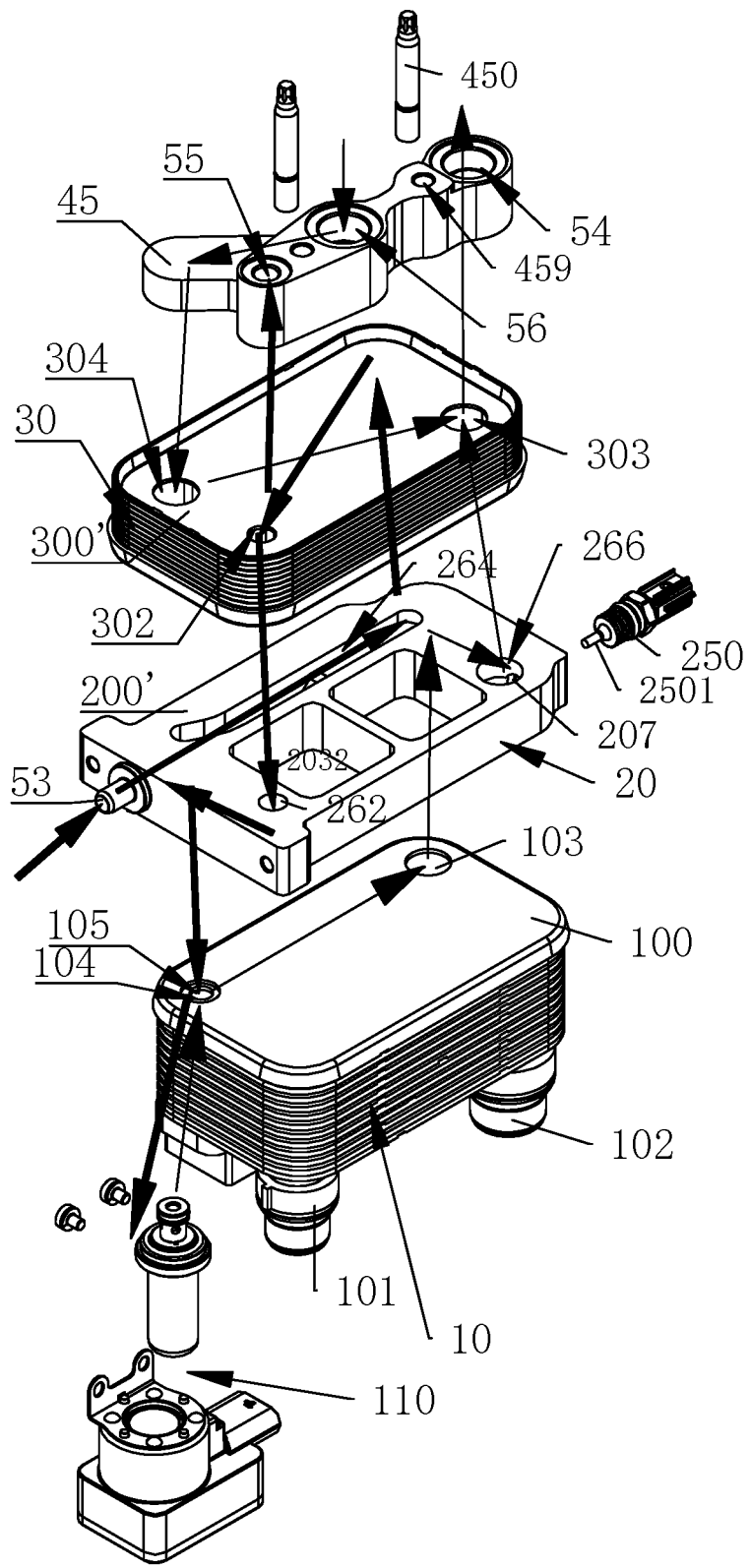
FIG. 34 is a schematic exploded view of the throttling heat exchange assembly shown in FIG. 33.
Figure 35:
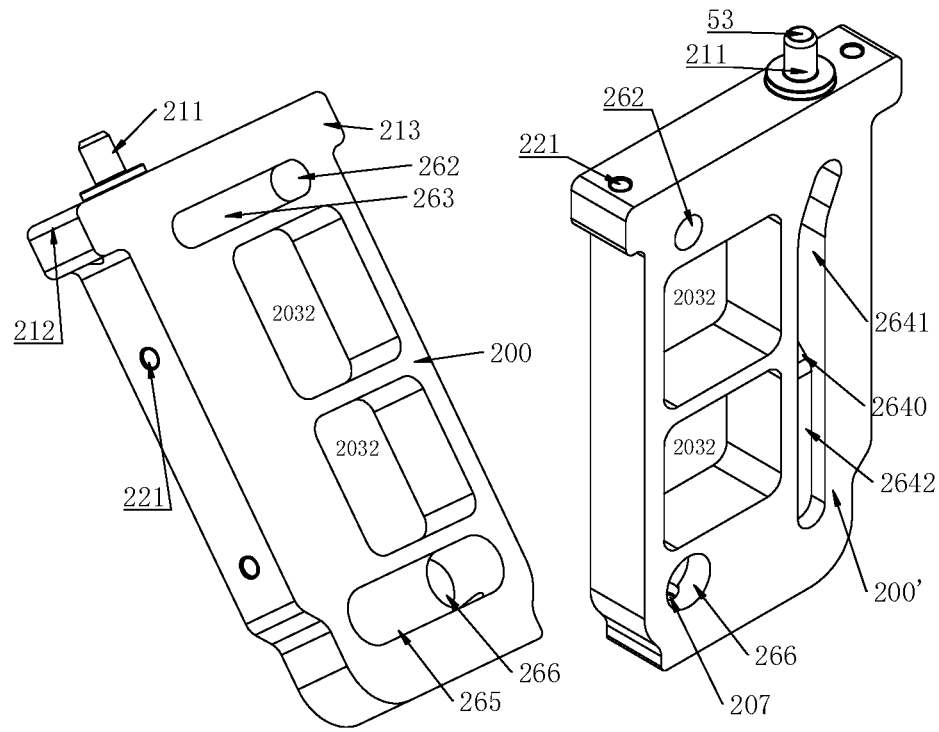
FIG. 35 shows two perspective views of the bridge of the throttling heat exchange assembly shown in FIG. 33 viewed from two perspectives.
Figure 36:
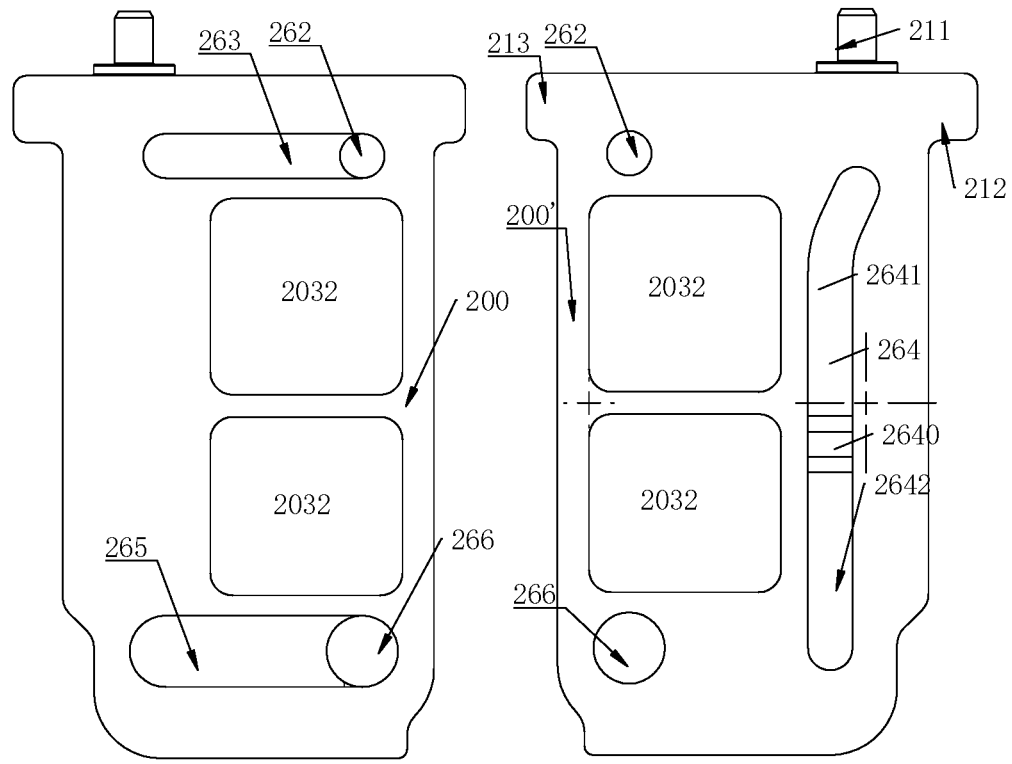
FIG. 36 shows a front view and a rear view of the bridge shown in FIG. 35.
Figure 37:
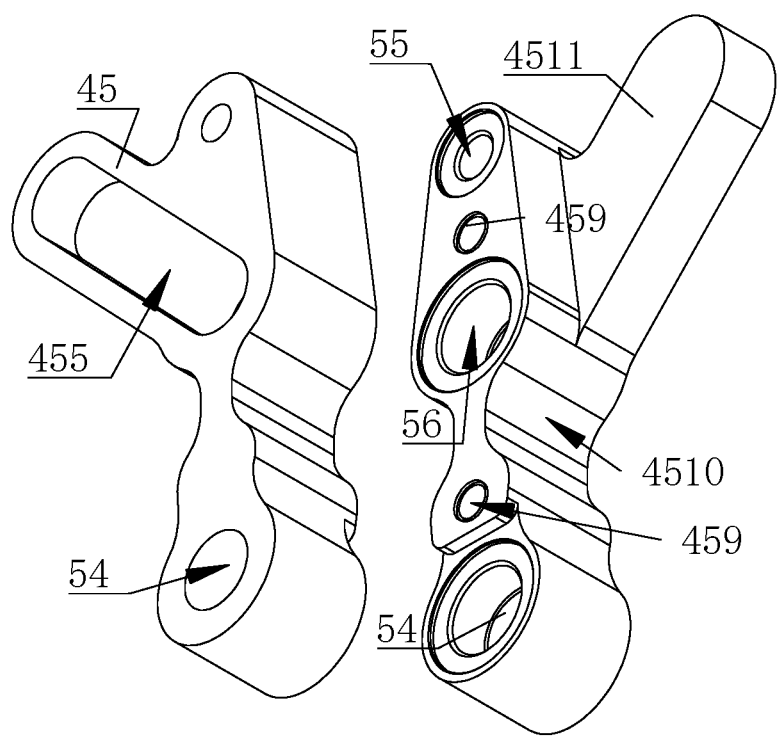
FIG. 37 shows two perspective views of the connecting member of the throttling heat exchange assembly shown in FIG. 33 viewed from two perspectives.

The throttling heat exchange assembly may also be embodied as shown in FIGS. 33 to 37. FIG. 33 is a schematic perspective view of a sixth embodiment of the throttling heat exchange assembly; FIG. 34 is a schematic exploded view of the throttling heat exchange assembly; FIG. 35 shows two perspective views of the bridge of the throttling heat exchange assembly viewed from two perspectives; FIG. 36 shows a front view and a rear view of the bridge shown in FIG. 35; and FIG. 37 shows two perspective views of the connecting member of the throttling heat exchange assembly shown in FIG. 33 viewed from two perspectives. The throttling heat exchange assembly includes a first heat exchange portion 10, a throttling element 110, a bridge 20, a second heat exchange portion 30, and a connecting member 45. Most of the bridge 20 is located between the first heat exchange portion 10 and the second heat exchange portion 30, and the connecting member 45 is located on another side of the second heat exchange portion 30, that is, the bridge 20 and the connecting member 45 are respectively arranged on two sides of the second heat exchange portion 30. The first heat exchange portion 10, the bridge 20, and the second heat exchange portion 30 are fixed by welding, or the first heat exchange portion 10, the bridge 20, the second heat exchange portion 30 and the connecting member are fixed by welding.

The first heat exchange portion 10 has a heat exchange core, the first heat exchange portion 10 has two flow passages through which fluids flow for heat exchange, and the two fluid flow passages are separated from each other. The first heat exchange portion 10 includes interlayer flow passages separated by stacked plates, and at least two kinds of fluids can flow through the first heat exchange portion 10. These two fluids can exchange heat in the first heat exchange portion 10, for example, one fluid is a refrigerant, and the other fluid may be a coolant for cooling heating elements such as a battery. In addition, the first heat exchange portion may also be used for three fluids. For example, one fluid is a refrigerant, and the other two fluids may be coolants. The two coolants may be controlled to selectively exchange heat with the refrigerant, and then the coolants can be used to cool the components that need to be cooled after the coolants are cooled by heat exchange. The following is described with two fluids flowing through the first heat exchange portion as an example.

The throttling heat exchange assembly has a first connecting port 51, a second connecting port 52, a third connecting port 53, a fourth connecting port 54, a fifth connecting port 55, and a sixth connecting port 56. The first heat exchange portion 10 is provided with the first connecting port 101 and the second connecting port 102, the bridge 20 is provided with the third connecting port 211, and the connecting member 45 is provided with the fourth connecting port 54, the fifth connecting port 55, and the sixth connecting port 56. The throttling element 110 is fixed or position-limited to the first heat exchange portion 10, where the first heat exchange portion 10 has four hole passages, such as a first hole passage 103 and a second hole passage 104 (not all shown in the figure). The first heat exchange portion 10 is further provided with a pipe with a communication port 105 in the second hole passage 104, the second hole passage 104 is not communicated on a side close to the bridge, and the communication port 105 is in communication with an inlet of the throttling element 110. The first connecting port portion 101 of the first heat exchange portion 10 has the first connecting port 51 which is configured to communicate with the coolant, the second connecting port portion 102 has the second connecting port 52 which is configured to communicate with the coolant, and the first connecting port 51 is in communication with the second connecting port 52 through a flow passage of the heat exchange core, where the first connecting port portion 101 and the second connecting port portion 102 may be a part of a side plate of the first heat exchange portion 10, or may be separately processed and fixed to a side plate of the first heat exchange portion 10 and/or the heat exchange core by welding.

The bridge 20 has a first cooperation portion 200 and a second cooperation portion 200'. Correspondingly, the first heat exchange portion 10 has a cooperation portion 100. The cooperation portion 100 of the first heat exchange portion 10 correspondingly cooperates with the first cooperation portion 200 of the bridge 20. The second heat exchange portion 30 has a cooperation portion 300, and the cooperation portion 300 correspondingly cooperates with the second cooperation portion 200' of the bridge 20. The cooperation portion 100 of the first heat exchange portion 10, the cooperation portion 300 of the second heat exchange portion 30 and the two cooperation portions of the bridge 20 each include a flat surface portion. An opening of a hole, a groove or a conducting portion for communication, arranged on a side, where the first cooperation portion 200 is located, of the bridge 20 is located inside the first cooperation portion 200, and each opening for communication is surrounded by the first cooperation portion 200, and the first heat exchange portion 10 has a respective opening for communication corresponding to each opening for communication of the bridge 20 in position, and each opening for communication of the first heat exchange portion 10 is located in the cooperation portion 100 thereof and each opening for communication thereof is surrounded by the cooperation portion 100. Thus, after the cooperation portion 100 of the first heat exchange portion 10 and the first cooperation portion 200 of the bridge 20 are welded and sealed, each opening for communication of the bridge 20 is in communication with the corresponding opening for communication of the first heat exchange portion 10, or in other words, each of the first heat exchange portion 10 and the bridge 20 includes a part of the corresponding cooperation portion thereof around each opening for communication thereof, and the two form a substantially closed structure at the cooperation portions which are arranged oppositely. The cooperation portion 300 of the second heat exchange portion 30 corresponds to the second cooperation portion 200' of the bridge 20 in position. Each opening for communication on a side, facing the second heat exchange portion 30, of the bridge 20 is in communication with a corresponding opening for communication of the second heat exchange portion 30 after the second cooperation portion 200' of the bridge 20 and the cooperation portion 300 of the second heat exchange portion 30 are welded and sealed. Specifically, the second heat exchange portion 30 has openings of three hole passages on a side facing the bridge 20: openings of a third hole passage 301, a fourth hole passage 302 and a first hole passage 303. The bridge 20 has an opening of a guiding groove 264, an opening of the hole 262, and an opening of the hole 266 on a side facing the second heat exchange portion 30, that is, on the second cooperation portion, where a diameter the hole 266 is greater than or equal to a diameter of the hole 262. The opening of the third hole passage 301 of the second heat exchange portion 30 corresponds to the opening of the guiding groove 264 in position, the opening of the fourth hole passage 302 corresponds to the opening of the hole 262 in position, and the opening of the first hole passage 303 corresponds to the opening of the hole 266 in position. The guiding groove 264 includes a first portion 2641, a second portion 2642 and a transition portion 2640. The first portion 2641 is relatively close to the third connecting port portion, the second portion 2642 is relatively away from the third connecting port portion, and the transition portion 2640 is located between the first portion 2641 and the second portion 2642. A depth of the first portion 2641 is greater than a depth of the second portion 2642, the depth of the first portion 2641 at a portion close to the third connecting port portion is larger than or equal to or about one half of a thickness of the bridge 20, such as larger than or equal to one third of the thickness of the bridge 20 and less than two thirds of the thickness of the bridge 20. The first portion 2641 is in communication with the third connecting port. The first heat exchange portion 10 has an opening of the first hole passage 103 and a communication port 105 which is in communication with the throttling element on a side facing the bridge 20, and the bridge 20 correspondingly has a third groove 263 and a fourth groove 265 on a side facing the first heat exchange portion 10, where the third groove 263 is in communication with the smaller hole 262, the fourth groove 265 is in communication with the larger hole 266, part of an opening of the fourth groove 265 corresponds to the opening of the first hole passage 103 of the first heat exchange portion 10 in position, and an opening of the third groove 263 is correspondingly in communication with the communication port 105 which is in communication with the throttling element. At least part of a projection of one of the guiding groove 264 and the third connecting port 53 onto the front side is located in the third groove 263, at least part of the projection of the guiding groove 264 onto the front side is located in the fourth groove 265, and at least part of the guiding groove 264 faces away from and is not in direct communication with the fourth groove 265. The ordinal terms such as "first", "second", "third", and "fourth" here are only for distinguishing and explaining, and do not represent the number of grooves or holes.

The bridge 20 includes a third connecting port portion 211. The third connecting port portion 211 has the third connecting port 53. The third connecting port portion 211 has a structure which protrudes outward. The third connecting port portion 211 may have a structure integrated with a main body of the bridge 20, or may have a structure that is processed separately and fixed to a main body of the bridge 20 by welding. The bridge 20 is further provided with two through holes 2032. The first portion 2641 of the guiding groove 264 is close to the third connecting port portion, the second portion 2642 of the guiding groove 264 is relatively away from the third connecting port portion, and the guiding groove 264 substantially extends along a length direction. The third connecting port 53 is in communication with the first portion 2641 of the guiding groove 264, the depth of the second portion 2642 of the guiding groove 264 is less than one half of the thickness of the bridge 20, or even no more than 0.4 times of the thickness of the bridge 20. A depth of the fourth groove 265 is less than one half of the thickness of the bridge 20, and a depth of the third groove 263 is less than one half of the thickness of the bridge 20, or, the depth of the fourth groove 265 is no more than 0.4 times of the thickness of the bridge 20, and the depth of the third groove 263 is no more than 0.4 times of the thickness of the bridge 20. In this way, the grooves can be respectively defined on two sides of the bridge 20 to form relatively independent flow passages with the two heat exchange portions, thereby reducing the whole assembly. The thickness of the bridge 20 herein refers to a distance between the two cooperation portions of the bridge. The bridge 20 is provided with two shoulders 212 and 213, at least part of the shoulders 212 and 213 protrude from the main body, the bridge 20 is provided with a fixing hole 221, and the fixing hole is defined in at least one shoulder or close to the shoulder.

The through holes 2032 herein are provided to reduce the weight and facilitate the welding between the bridge 20 and the first and second heat exchange portions 10, 30. The through holes 2032 extend from one side of the bridge 20 close to the first heat exchange portion 10 to another side of the bridge 20 close to the second heat exchange portion 30, the through holes 2032 are not in communication with the hole passages of the first heat exchange portion 10, the through hole 2032 are not in communication with the hole passages of the second heat exchange portion 30, and the through holes 2032 are not in communication with the holes or grooves for communication of the bridge. A distance between each through hole 2032 and the hole for communication, facing or close to the first heat exchange portion 10, of the bridge 20 is greater than or equal to 1.5 mm; a distance between each through hole 2032 and the groove for communication, facing or close to the first heat exchange portion, of the bridge is greater than or equal to 1.5 mm; a distance between each through hole 2032 and the hole for communication, facing or close to the second heat exchange portion, of the bridge is greater than or equal to 1.5 mm, and a distance between each through hole 2032 and the groove for communication, facing or close to the second heat exchange portion, of the bridge is greater than or equal to 1.5 mm.

The connecting member 45 includes a main body portion 4510 and an extension portion 4511. The connecting member 45 is provided with the fourth connecting port 54, the fifth connecting port 55, and the sixth connecting port 56, and is further provided with a fixing hole 459 for fixing or position-limiting. The connecting member 45 has a groove 455 on a side facing the second heat exchange portion 30, and the groove 455 has a blind-hole-like structure. The groove 455 extends from the extension portion to the position where the sixth connecting port 56 is located, and the groove 455 is in communication with the sixth connecting port 56. The connecting member may further include a fixing member 450 for fixing or position-limiting, and the fixing member 450 may be fixed or position-limited to the fixing hole 409. The second heat exchange portion has the fourth hole passage 302, the first hole passage 303 and the second hole passage 304 on a side facing the connecting member 40, where the fourth connecting port 54 of the connecting member 40 corresponds to the first hole passage 303, the fifth connecting port 55 corresponds to the fourth hole passage 302, and the sixth connecting port 56 is correspondingly in communication with the second hole passage 304 through the groove 455.

The throttling heat exchange assembly can facilitate the mounting and connection of the thermal management system, reduce the number of connected pipes, and reduce the volume of the system. The throttling heat exchange assembly used in the vehicle thermal management system is taken as an example for description. It should be noted that, these components are relatively fixed during actual use. For the sake of clarity, the flow of the refrigerant is shown in the exploded view, which is only for clarity and description. In a specific vehicle thermal management system, the vehicle thermal management system includes a refrigerant system and a battery thermal management system. Referring to FIG. 34 and other views, the battery thermal management system includes the first connecting port portion 101 and the second connecting port portion 102 of the throttling heat exchange assembly, and the flow passage, in communication with the first connecting port and the second connecting port, of the first heat exchange portion. The heat of the battery can be transferred to the coolant. The coolant flows through the flow passage of the first heat exchange portion from the first connecting port 51 or the second connecting port 52, and exchanges heat in the first heat exchange portion with a refrigerant in another flow passage, so that the coolant is cooled and then flows back to cool the battery. The third connecting port 53, the fourth connecting port 54, the fifth connecting port 55, and the sixth connecting port 56 are respectively in communication with the refrigerant system. For example, the refrigerant cooled by a condenser enters the throttling heat exchange assembly from the third connecting port 53, or the refrigerant flowing through a liquid reservoir enters the throttling heat exchange assembly from the third connecting port 53, so that the high-temperature and high-pressure refrigerant flows through a flow passage formed by the bridge and the second heat exchange portion and also formed by a space where the guiding groove 264 is located, then enters the third hole passage 301 of the second heat exchange portion, and then flows into the fourth hole passage 302 after exchanging heat in the second heat exchange portion 30 with the refrigerant in another flow passage, and the refrigerant flowing into the fourth hole passage 302 is divided into two parts: one part flows through the connecting member 45 and flows out from the fifth connecting port 55, for example, this part flows to a front evaporator or other evaporator from the fifth connecting port 55, and the throttling element may be arranged before the evaporator, or the refrigerant is divided to flow into two evaporators after being throttled, or the refrigerant enters the evaporator after being divided and throttled; the other part of the refrigerant flows through the hole 262 of the bridge, then flows through a flow passage formed by the bridge and the cooperation portion of the first heat exchange portion and also formed by a space where the third groove 263 is located, flows into the throttling element 110 through the communication port 105 which is in communication with the throttling element, and then flows into the second hole passage 104 of the first heat exchange portion 10 after being throttled by the throttling element 110, and then exchanges heat in the refrigerant flow passage of the first heat exchange portion with the coolant in the coolant flow passage, then reaches the first hole passage 103, then flows through a flow passage formed by the bridge and the cooperation portion of the first heat exchange portion and also formed by a space where the fourth guiding groove 265 is located, then flows through the hole 266, then reaches the first hole passage 303 of the second heat exchange portion, then flows out from the fourth connecting port corresponding to the first hole passage 303, and then, for example, flows into to a compressor. In addition, the sixth connecting port 56 may be configured to introduce the refrigerant flowing back from the front evaporator or other evaporator, this low-temperature refrigerant flows into the second hole passage 304 of the second heat exchange portion through a flow passage formed by the connecting member 45 and the second heat exchange portion and also formed by a space where the groove 455 is located, then flows toward the first hole passage 303, then exchanges heat with the high-temperature refrigerant flowing from the third hole passage 301 into the fourth hole passage 302, and the two refrigerants converge in the first hole passage 303 and flow back to the compressor through the fourth connecting port 54, so that the low-temperature refrigerant is used to cool the high-temperature refrigerant, which can lower the condensing temperature of the refrigerant and prevent the temperature of the refrigerant returning to the compressor from being excessively high. The bridge 20 is further provided with a first mounting portion 207 for mounting a sensing element 250, such as a temperature sensing element. A sensing head 2501 for sensing temperature is directed through the mounting portion and located in the flow passage where the hole 266 and/or the fourth groove 265 is located, so that a temperature of the refrigerant flowing through the first heat exchange portion or an outlet temperature of the evaporator can be obtained. The second heat exchange portion can realize the heat exchange between the high-temperature refrigerant and part of the low-temperature refrigerant, lower the temperature of the high temperature refrigerant, and prevent the temperature of the refrigerant returning to the compressor from being excessively high, thereby improving the efficiency.

The throttling heat exchange assembly includes the first heat exchange portion, the bridge, and the second heat exchange portion. At least part of the bridge is located between the first heat exchange portion and the second heat exchange portion. The fluid communication between the two heat exchange portions can be relatively conveniently realized through the bridge, and different system requirements can be realized by changing the structure of the bridge, so that the piping of the system is simple, the provision of pipelines between the connecting ports can be reduced, and the system connection is simple and convenient. The refrigerant flow passage of the first heat exchange portion of the above assembly may have one flow routine, that is, from the second hole passage 104 to the first hole passage 103, or it may have three flow routines, that is, the first heat exchange portion is substantially divided into three parts transversely, the first flow routine is from the lowermost part of the second hole passage 104 to the lowermost part of the first hole passage 103, the second flow routine is from the middle part of the first hole passage 103 to the middle part of the second hole passage 104, and the third flow routine is from the upper part of the second hole passage 104 to the upper part of the first hole passage 103. Therefore, it is only described in the embodiment that the refrigerant flows out from the first hole passage 103. Unless otherwise specified, the thickness of the bridge refers to a distance between the flat surface portions of the two cooperation portions of the bridge. The flow direction herein is only for illustration and should not be construed as restriction or closed requirement, and other components can be added in it, such as adding other control valves before the compressor, or adding the throttling element before the evaporator. The assembly may even be provided with the control valve. Herein, the second hole passage 104 of the first heat exchange portion is in communication with an outlet of the throttling element 110. However, generally no opening is provided on a side facing the bridge, and the opening in the figure is only for illustrating the location of the hole passage. These technical solutions may be modified according to the actual system, and the communication situation is in accordance with the specific technical solution. For example, if the first connecting port is in communication with the second connecting port, it does not rule out that other situation that other connecting ports may also be communicated at the same time.

It should be noted that, the description of the above embodiments is only used to illustrate the present application and is not intended to limit the technical solutions of the present application, such as the definitions of orientation terms such as "front", "rear", "left", "right", "up", and "down". Although the present application has been described in detail with reference to the above embodiments, it should be understood by those skilled in the art that, various modifications, combinations, or equivalent substitutions can be made to the technical solutions of the present application, and all the technical solutions and improvements without departing from the spirit and scope of the present application shall be covered within the scope of the claims of the present application.

The invention claimed is:

1. A throttling heat exchange assembly, comprising a first heat exchange portion, a bridge, a second heat exchange portion, and a throttling element, wherein at least part of the bridge is located between the first heat exchange portion and the second heat exchange portion, wherein the first heat exchange portion, the bridge and the second heat exchange portion are fixed by welding; the first heat exchange portion has a heat exchange core, and the first heat exchange portion comprises at least two fluid flow passages which are not in communication with each other; the throttling element is fixed or position-limited to the first heat exchange portion, or the throttling element is fixed or position-limited to the bridge;

the throttling heat exchange assembly comprises a first connecting port, a second connecting port, and a third connecting port; the first heat exchange portion comprises a first connecting port portion and a second connecting port portion; the first connecting port portion has the first connecting port, and the second connecting port portion has the second connecting port; the bridge comprises two holes or grooves facing the first heat exchange portion for communication; the bridge comprises at least two holes and/or grooves which are in communication with the second heat exchange portion, and openings of the at least two holes or grooves of the bridge which are in communication with the second heat exchange portion face the second heat exchange portion; the bridge is further provided with a first mounting portion, the throttling heat exchange assembly comprises a sensing element, the sensing element is mounted on the first mounting portion, a sensing head of the sensing element is located in one hole and/or one groove of the bridge, a first hole passage of the first heat exchange portion and a first hole passage of the second heat exchange portion are in communication with each other through the hole and/or the groove where the sensing head is located.

2. The throttling heat exchange assembly according to claim 1, wherein the throttling element is fixed or position-limited to the first heat exchange portion; the throttling heat exchange assembly further comprises a connecting member, the throttling heat exchange assembly further comprises a fourth connecting port, a fifth connecting port, and a sixth connecting port, the connecting member has the fourth connecting port, the fifth connecting port, and the sixth connecting port; one of the two holes and/or grooves, facing or close to the first heat exchange portion for communication, of the bridge is in communication with the throttling element, and the other one is in communication with the first hole passage of the first heat exchange portion; and the two holes and/or grooves, in communication with the second heat exchange portion, of the bridge are each in communication with one hole passage of the second heat exchange portion.

3. The throttling heat exchange assembly according to claim 1, wherein the bridge comprises a second mounting portion, the throttling element is fixed or position-limited to the bridge, and the throttling element is fixed to or limited to the second mounting portion; the two holes and/or grooves, facing or close to the first heat exchange portion for communication, of the bridge comprise a hole, the hole is located in the second mounting portion, the hole is in communication with an outlet of throttling element, the outlet of the throttling element is in communication with a second hole passage of the first heat exchange portion through the hole, the other one of the two holes and/or grooves, facing or close to the first heat exchange portion for communication, of the bridge is in communication with the first hole passage of the first heat exchange portion; one of the two holes and/or grooves, in communication with the second heat exchange portion, of the bridge is in communication with the first hole passage of the second heat exchange portion, and the other one is in communication with an inlet of the throttling element and is in communication with a hole passage of the second heat exchange portion; and the first hole passage of the first heat exchange portion is in communication with the first hole passage of the second heat exchange portion through the bridge or a flow passage.

4. The throttling heat exchange assembly according to claim 3, wherein the second heat exchange portion is not larger than the first heat exchange portion, and at least part of the second mounting portion protrudes from the second heat exchange portion; the bridge has a hole for communication on a side facing the first heat exchange portion, the hole corresponds to the first hole passage of the first heat exchange portion in position or is in communication with the first hole passage of the first heat exchange portion; the bridge further has a groove on the side facing the first heat exchange portion, and the bridge comprises a hole; the hole is located on one side of the groove or one side of the groove is in communication with the hole, an inclined hole is defined on another side of the groove, a hole of the second mounting portion; is in communication with the groove through the inclined hole, and the hole of the second mounting portion is in communication with the hole through the inclined hole and the groove; the sensing head is located in one through hole of the bridge, one end of the through hole is in communication with or is opposite to and in communication with the first hole passage of the first heat exchange portion, and the other end of the through hole is in communication with or is opposite to and in communication with the first hole passage of the second heat exchange portion.

5. The throttling heat exchange assembly according to claim 1, wherein the bridge comprises a third connecting port portion, the bridge is provided with a guiding hole-on a side facing the second heat exchange portion, the guiding hole is in communication with the third connecting port, the guiding hole is arranged close to the third connecting port portion, a depth of the guiding hole is larger than or equal to one third of a thickness of the bridge and is less than two thirds of the thickness of the bridge, and the guiding hole is in communication with or is opposite to and in communication with a third hole passage of the second heat exchange portion; the bridge further comprises a through hole, a first groove, a second groove and a guiding portion, wherein the guiding portion comprises a hole and a groove, the first groove is arranged on the side facing the second heat exchange portion, the second groove and the groove of the guiding portion are arranged on a side facing the first heat exchange portion; the first groove is in communication with the second groove through the through hole; the first groove is in communication with a fourth hole passage of the second heat exchange portion; the first hole passage of the first heat exchange portion is in communication with the first hole passage of the second heat exchange portion through the guiding portion of the bridge; the side, facing the first heat exchange portion, of the bridge is defined as a front side, the side, facing the second heat exchange portion, of the bridge is defined as a rear side, at least part of a projection of the first groove onto the front side is located in the groove of the guiding portion, and at least part of a projection of the guiding hole onto the front side is located in the second groove.

6. The throttling heat exchange assembly according to claim 1, wherein the bridge comprises a third connecting port portion, the bridge is provided with a guiding groove, a smaller hole and a larger hole on a side facing the second heat exchange portion, the larger hole is larger than or equal to the smaller hole, the guiding groove is in communication with the third connecting port, the guiding groove comprises a first portion and a second portion, the first portion is relatively close to the third connecting port portion, the second portion is relatively away from the third connecting port portion; a depth of at least part of the first portion is larger than a depth of the second portion, a depth of at least part of the first portion at a portion close to the third connecting port portion is larger than or equal to one third of a thickness of the bridge, the first portion is in communication with the third connecting port;

the second heat exchange portion has openings of three hole passages on a side facing the bridge, the guiding groove, the smaller hole and the larger hole of the bridge are in communication with the three hole passages of the second heat exchange portion respectively; the bridge has a third groove and a fourth groove on a side facing the first heat exchange portion, the third groove is in communication with the smaller hole, and the fourth groove is in communication with the larger hole;

the first hole passage of the first heat exchange portion is in communication with one hole passage of the second heat exchange portion through the fourth groove and the larger hole, and/or, the first hole passage of the first heat exchange portion is in communication with one hole passage of the second heat exchange portion through the third groove and the smaller hole; and the side, facing the first heat exchange portion, of the bridge is defined as a front side, the side, facing the second heat exchange portion, of the bridge is defined as a rear side, at least part of a projection of one of the guiding groove and the third connecting port onto the front side is located in the third groove, and at least part of the projection of the guiding groove onto the front side is located in the fourth groove.

7. The throttling heat exchange assembly according to claim 6, wherein the throttling heat exchange assembly further comprises a connecting member, the connecting member is located on a side, facing away from the bridge, of the second heat exchange portion; the connecting member has a fourth connecting port, a fifth connecting port and a sixth connecting port; the fourth connecting port is in communication with the first hole passage of the second heat exchange portion, the fifth connecting port is in communication with a fourth hole passage of the second heat exchange portion, and the sixth connecting port is in communication with a second hole passage of the second heat exchange portion; the bridge comprises three holes or grooves which are in communication with the second heat exchange portion, the bridge comprises a third connecting port portion which is provided with the third connecting port, the third connecting port of the throttling heat exchange assembly is in communication with a third hole passage of the second heat exchange portion through the holes and/or grooves of the bridge.

8. The throttling heat exchange assembly according to claim 1, wherein the throttling heat exchange assembly further comprises a connecting member, the connecting member is located on a side, facing away from the bridge, of the second heat exchange portion; the connecting member has a fourth connecting port, a fifth connecting port, a sixth connecting port and a seventh connecting port; the bridge comprises a third connecting port portion which has the third connecting port; the bridge comprises three holes which are in communication with the second heat exchange portion, the third connecting port is in communication with a third hole passage of the second heat exchange portion through the first hole of the three holes, the second hole of the three holes is in communication with a fourth hole passage of the second heat exchange portion, the third hole of the three holes is a through hole, the first hole passage of the first heat exchange portion is in communication with the first hole passage of the second heat exchange portion through the through hole; the seventh connecting port is in communication with the fourth hole passage of the second heat exchange portion; and the connecting member is fixed to the second heat exchange portion by welding.

9. The throttling heat exchange assembly according to claim 1, wherein the bridge has a first cooperation portion and a second cooperation portion, the first heat exchange portion has a cooperation portion, the cooperation portion of the first heat exchange portion is configured to correspondingly cooperate with the first cooperation portion of the bridge; the second heat exchange portion has a cooperation portion, the cooperation portion of the second heat exchange portion is configured to correspondingly cooperate with the second cooperation portion of the bridge; the cooperation portion of the first heat exchange portion, the cooperation portion of the second heat exchange portion, and the first cooperation portion and the second cooperation portion of the bridge each comprise a flat surface portion; openings of the two holes or grooves of the bridge which are in communication with, facing, or close to the first heat exchange portion are located inside the first cooperation portion; and openings of the at least two holes or grooves of the bridge which are in communication with and close to the second heat exchange portion are located inside the second cooperation portion.

10. The throttling heat exchange assembly according to claim 1, wherein the bridge further comprises at least one weight-reduction hole, the at least one weight-reduction hole extends from a side, close to the first heat exchange portion, of the bridge to a side, close to the second heat exchange portion, of the bridge; the at least one weight-reduction hole is not in communication with any hole passage of the first heat exchange portion, the at least one weight-reduction hole is not in communication with any hole passage of the second heat exchange portion, the at least one weight-reduction hole is not in communication with any hole or groove for communication of the bridge; a distance between the at least one weight-reduction hole and each hole or groove for communication, facing or close to the first heat exchange portion, of the bridge is greater than or equal to 1.5 mm, and a distance between the at least one weight-reduction hole and each hole or groove for communication, facing or close to the second heat exchange portion, of the bridge is greater than or equal to 1.5 mm.

11. The throttling heat exchange assembly according to claim 2, wherein the bridge comprises a third connecting port portion, the bridge is provided with a guiding hole on a side facing the second heat exchange portion, the guiding hole is in communication with the third connecting port, the guiding hole is arranged close to the third connecting port portion, a depth of the guiding hole is larger than or equal to one third of a thickness of the bridge and is less than two thirds of the thickness of the bridge, and the guiding hole is in communication with or is opposite to and in communication with a third hole passage of the second heat exchange portion; the bridge further comprises a through hole, a first groove, a second groove and a guiding portion, wherein the guiding portion comprises a hole and a groove, the first groove is arranged on the side facing the second heat exchange portion, the second groove and the groove of the guiding portion are arranged on a side facing the first heat exchange portion; the first groove is in communication with the second groove through the through hole; the first groove is in communication with a fourth hole passage of the second heat exchange portion; the first hole passage of the first heat exchange portion is in communication with the first hole passage of the second heat exchange portion through the guiding portion of the bridge; the side, facing the first heat exchange portion, of the bridge is defined as a front side, the side, facing the second heat exchange portion, of the bridge is defined as a rear side, at least part of a projection of the first groove onto the front side is located in the groove of the guiding portion, and at least part of a projection of the guiding hole onto the front side is located in the second groove.

12. The throttling heat exchange assembly according to claim 2, wherein the bridge comprises a third connecting port portion, the bridge is provided with a guiding groove, a smaller hole and a larger hole on a side facing the second heat exchange portion, the larger hole is larger than or equal to the smaller hole, the guiding groove is in communication with the third connecting port, the guiding groove comprises a first portion and a second portion, the first portion is relatively close to the third connecting port portion, the second portion is relatively away from the third connecting port portion; a depth of at least part of the first portion is larger than a depth of the second portion, a depth of at least part of the first portion at a portion close to the third connecting port portion is larger than or equal to one third of a thickness of the bridge, the first portion is in communication with the third connecting port;

the second heat exchange portion has openings of three hole passages on a side facing the bridge, the guiding groove, the smaller hole and the larger hole of the bridge are in communication with the three hole passages of the second heat exchange portion respectively; the bridge has a third groove and a fourth groove on a side facing the first heat exchange portion, the third groove is in communication with the smaller hole, and the fourth groove is in communication with the larger hole;

the first hole passage of the first heat exchange portion is in communication with one hole passage of the second heat exchange portion through the fourth groove and the larger hole, and/or, the first hole passage of the first heat exchange portion is in communication with one hole passage of the second heat exchange portion through the third groove and the smaller hole; and the side, facing the first heat exchange portion, of the bridge is defined as a front side, the side, facing the second heat exchange portion, of the bridge is defined as a rear side, at least part of a projection of one of the guiding groove and the third connecting port onto the front side is located in the third groove, and at least part of the projection of the guiding groove onto the front side is located in the fourth groove.

13. The throttling heat exchange assembly according to claim 2, wherein the throttling heat exchange assembly further comprises a connecting member, the connecting member is located on a side, facing away from the bridge, of the second heat exchange portion; the connecting member has a fourth connecting port, a fifth connecting port and a sixth connecting port; the fourth connecting port is in communication with the first hole passage of the second heat exchange portion, the fifth connecting port is in communication with a fourth hole passage of the second heat exchange portion, and the sixth connecting port is in communication with a second hole passage of the second heat exchange portion; the bridge comprises three holes or grooves which are in communication with the second heat exchange portion, the bridge comprises a third connecting port portion which is provided with the third connecting port, the third connecting port of the throttling heat exchange assembly is in communication with a third hole passage of the second heat exchange portion through the holes and/or grooves of the bridge.

14. The throttling heat exchange assembly according to claim 3, wherein the throttling heat exchange assembly further comprises a connecting member, the connecting member is located on a side, facing away from the bridge, of the second heat exchange portion; the connecting member has a fourth connecting port, a fifth connecting port and a sixth connecting port; the fourth connecting port is in communication with the first hole passage of the second heat exchange portion, the fifth connecting port is in communication with a fourth hole passage of the second heat exchange portion, and the sixth connecting port is in communication with a second hole passage of the second heat exchange portion; the bridge comprises three holes or grooves which are in communication with the second heat exchange portion, the bridge comprises a third connecting port portion which is provided with the third connecting port, the third connecting port of the throttling heat exchange assembly is in communication with a third hole passage of the second heat exchange portion through the holes and/or grooves of the bridge.

15. The throttling heat exchange assembly according to claim 5, wherein the throttling heat exchange assembly further comprises a connecting member, the connecting member is located on a side, facing away from the bridge, of the second heat exchange portion; the connecting member has a fourth connecting port, a fifth connecting port and a sixth connecting port; the fourth connecting port is in communication with the first hole passage of the second heat exchange portion, the fifth connecting port is in communication with a fourth hole passage of the second heat exchange portion, and the sixth connecting port is in communication with a second hole passage of the second heat exchange portion; the bridge comprises three holes or grooves which are in communication with the second heat exchange portion, the bridge comprises a third connecting port portion which is provided with the third connecting port, the third connecting port of the throttling heat exchange assembly is in communication with a third hole passage of the second heat exchange portion through the holes and/or grooves of the bridge.

16. The throttling heat exchange assembly according to claim 6, wherein the throttling heat exchange assembly further comprises a connecting member, the connecting member is located on a side, facing away from the bridge, of the second heat exchange portion; the connecting member has a fourth connecting port, a fifth connecting port and a sixth connecting port; the fourth connecting port is in communication with the first hole passage of the second heat exchange portion, the fifth connecting port is in communication with a fourth hole passage of the second heat exchange portion, and the sixth connecting port is in communication with a second hole passage of the second heat exchange portion; the bridge comprises three holes or grooves which are in communication with the second heat exchange portion, the bridge comprises a third connecting port portion which is provided with the third connecting port, the third connecting port of the throttling heat exchange assembly is in communication with a third hole passage of the second heat exchange portion through the holes and/or grooves of the bridge.

17. The throttling heat exchange assembly according to claim 2, wherein the throttling heat exchange assembly further comprises a connecting member, the connecting member is located on a side, facing away from the bridge, of the second heat exchange portion; the connecting member has a fourth connecting port, a fifth connecting port, a sixth connecting port and a seventh connecting port; the bridge comprises a third connecting port portion which has the third connecting port; the bridge comprises three holes which are in communication with the second heat exchange portion, the third connecting port is in communication with a third hole passage of the second heat exchange portion through the first hole of the three holes, the second hole of the three holes is in communication with a fourth hole passage of the second heat exchange portion, the third hole of the three holes is a through hole, the first hole passage of the first heat exchange portion is in communication with the first hole passage of the second heat exchange portion through the through hole; the seventh connecting port is in communication with the fourth hole passage of the second heat exchange portion; and the connecting member is fixed to the second heat exchange portion by welding.

18. The throttling heat exchange assembly according to claim 3, wherein the throttling heat exchange assembly further comprises a connecting member, the connecting member is located on a side, facing away from the bridge, of the second heat exchange portion; the connecting member has a fourth connecting port, a fifth connecting port, a sixth connecting port and a seventh connecting port; the bridge comprises a third connecting port portion which has the third connecting port; the bridge comprises three holes which are in communication with the second heat exchange portion, the third connecting port is in communication with a third hole passage of the second heat exchange portion through the first hole of the three holes, the second hole of the three holes is in communication with a fourth hole passage of the second heat exchange portion, the third hole of the three holes is a through hole, the first hole passage of the first heat exchange portion is in communication with the first hole passage of the second heat exchange portion through the through hole; the seventh connecting port is in communication with the fourth hole passage of the second heat exchange portion; and the connecting member is fixed to the second heat exchange portion by welding.

* * * * *